United States Patent
Yoon et al.

(10) Patent No.: US 12,504,781 B2
(45) Date of Patent: Dec. 23, 2025

(54) MULTI-FOLDABLE ELECTRONIC DEVICE INCLUDING A PLATE ARRANGEMENT

(71) Applicant: Samsung Display Co., Ltd., Yongin-si (KR)

(72) Inventors: Hyoyul Yoon, Yongin-si (KR); Kyoungah Lee, Yongin-si (KR); Eunhye Kang, Yongin-si (KR); Mingu Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 231 days.

(21) Appl. No.: 18/344,661

(22) Filed: Jun. 29, 2023

(65) Prior Publication Data
US 2024/0045467 A1 Feb. 8, 2024

(30) Foreign Application Priority Data
Aug. 8, 2022 (KR) ........................ 10-2022-0098611

(51) Int. Cl.
*G06F 1/16* (2006.01)
*H04M 1/02* (2006.01)

(52) U.S. Cl.
CPC .......... *G06F 1/1616* (2013.01); *G06F 1/1656* (2013.01); *H04M 1/0216* (2013.01)

(58) Field of Classification Search
CPC .... G06F 1/1616; G06F 1/1656; G06F 1/1641; H04M 1/0216
See application file for complete search history.

(56) References Cited

U.S. PATENT DOCUMENTS

| | | | |
|---|---|---|---|
| 9,874,772 B2 | 1/2018 | Kim et al. | |
| 2018/0217639 A1* | 8/2018 | Jones | G06F 1/1652 |
| 2019/0334114 A1* | 10/2019 | Park | G06F 1/203 |
| 2020/0333522 A1* | 10/2020 | Kang | G02B 5/3041 |
| 2021/0068276 A1* | 3/2021 | Kim | G06F 1/1652 |
| 2021/0134192 A1* | 5/2021 | Lee | G06F 1/1652 |
| 2021/0174711 A1* | 6/2021 | Cho | H10K 59/10 |
| 2022/0147107 A1* | 5/2022 | Wang | G06F 1/1637 |
| 2022/0199922 A1* | 6/2022 | Choi | B32B 27/40 |
| 2022/0201879 A1* | 6/2022 | Kwak | H05K 5/0217 |

FOREIGN PATENT DOCUMENTS

| | | |
|---|---|---|
| CN | 110189638 A | 8/2019 |
| KR | 10-2319075 B1 | 11/2021 |
| KR | 10-2342869 B1 | 12/2021 |

\* cited by examiner

*Primary Examiner* — Sagar Shrestha
*Assistant Examiner* — Peter Krim
(74) *Attorney, Agent, or Firm* — Womble Bond Dickinson (US) LLP

(57) ABSTRACT

Disclosed is an electronic device including a display module, a window above the display module and including a bottom surface facing the display module, and a top surface opposite to the bottom surface, a lower film below the display module, a plate below the lower film and including a first non-folding part, a first folding part, a second non-folding part, a second folding part, and a third non-folding part that are sequentially arranged, the first folding part being configured to be folded with a first curvature and defining first holes, and the second folding part being configured to be folded with a second curvature that is different from the first curvature and defining second holes, and a first adhesion layer between the window and the plate, and defining a first opening that overlaps the first folding part and some of the first holes.

20 Claims, 22 Drawing Sheets

MULTI-FOLDABLE ELECTRONIC DEVICE INCLUDING A PLATE ARRANGEMENT

CROSS-REFERENCE TO RELATED APPLICATION

This application claims priority to, and the benefit of, Korean Patent Application No. 10-2022-0098611 filed on Aug. 8, 2022, in the Korean Intellectual Property Office, the disclosure of which is hereby incorporated by reference in its entirety.

BACKGROUND

1. Field

Embodiments of the present disclosure relate to a foldable electronic device, and to an electronic device that includes an adhesion layer capable of increasing folding properties.

2. Description of the Related Art

Various types of electronic devices provide image information, and there have recently been developed electronic devices including foldable or bendable flexible display modules. Unlike rigid electronic devices, flexible electronic devices may be changed in various shapes such as being folded, rolled, or bent so that the flexible electronic devices have portable characteristics irrespective of screen sizes.

Such flexible electronic device has been studied to reduce stress applied to its components when being folded or bent.

SUMMARY

One or more embodiments provide an electronic device whose folding region has improved flexibility.

According to one or more embodiments, an electronic device includes a display module, a window above the display module and including a bottom surface facing the display module, and a top surface opposite to the bottom surface, a lower film below the display module, a plate below the lower film and including a first non-folding part, a first folding part, a second non-folding part, a second folding part, and a third non-folding part that are sequentially arranged, the first folding part being configured to be folded with a first curvature and defining first holes, and the second folding part being configured to be folded with a second curvature that is different from the first curvature and defining second holes, and a first adhesion layer between the window and the plate, and defining a first opening that overlaps the first folding part and some of the first holes.

In a folding mode, the first folding part may be configured to be folded such that the top surface of the window that overlaps the first non-folding part faces the top surface of the window that overlaps the second non-folding part, the second folding part may be configured to be folded such that the bottom surface of the window that overlaps the second non-folding part faces the bottom surface of the window that overlaps the third non-folding part, and the first curvature may be greater than the second curvature.

The first opening may extend from an area over one of the first holes nearest the first non-folding part to an area over one of the first holes that overlaps a region at or near a center of the first folding part.

The first folding part may include a first side curvature part that extends from the first non-folding part, a second side curvature part that extends from the second non-folding part, a main curvature part between the first side curvature part and the second side curvature part, and defining the first holes, a first flat part between the first side curvature part and the main curvature part, and a second flat part between the second side curvature part and the main curvature part, wherein a center of curvature of the main curvature part is above the top surface of the window, and wherein a center of curvature of each of the first and second side curvature parts is below the bottom surface of the window.

The plate may define first side holes that overlap the first side curvature part, and that partially penetrate from a bottom surface of the plate, and second side holes that overlap the second side curvature part, and that partially penetrate from the bottom surface of the plate.

The first opening may extend from an area over one of the first side holes nearest the first non-folding part to an area over one of the first holes that overlaps a region at or near a center of the main curvature part.

The first opening may extend from an area over the first flat part near the first side curvature part to an area over one of the first holes that overlaps a region at or near a center of the main curvature part.

The first opening may extend from an area over one of the first holes nearest the first flat part to an area over one of the first holes that overlaps a region at or near a center of the main curvature part.

In a folding mode the first folding part may be configured to be folded such that the top surface of the window that overlaps the first non-folding part faces the top surface of the window that overlaps the second non-folding part, the second folding part may be configured to be folded such that the bottom surface of the window that overlaps the first non-folding part faces the top surface of the window that overlaps the third non-folding part, and the first curvature may be greater than the second curvature.

The first opening may extend from an area over one of the first holes nearest the first non-folding part to an area over one of the first holes that overlaps a region at or near a center of the first folding part.

The first folding part may include a first side curvature part that extends from the first non-folding part, a second side curvature part that extends from the second non-folding part, a main curvature part between the first side curvature part and the second side curvature part, a first flat part between the first side curvature part and the main curvature part, and a second flat part between the second side curvature part and the main curvature part, wherein a center of curvature of the main curvature part is above the top surface of the window, and wherein a center of curvature of each of the first and second side curvature parts is below the bottom surface of the window.

The plate may define first side holes that overlap the first side curvature part, and that penetrate a portion of the plate, and second side holes that overlap the second side curvature part, and that penetrate a portion of the plate.

The first opening may extend from an area over one of the second side holes nearest the second non-folding part to an area over one of the first holes that overlaps a region at or near a center of the main curvature part.

The first opening may extend from an area over the second flat part near the second side curvature part to an area over one of the first holes that overlaps a region at or near a center of the main curvature part.

The first opening may extend from an area over one of the first holes nearest the second flat part to an area over one of the first holes that overlaps a region at or near a center of the main curvature part.

The first adhesion layer may define a second opening that overlaps the second folding part and some of the second holes, and that extends from an area over one of the second holes nearest the second non-folding part to an area over one of the second holes that overlaps a region at or near a center of the second folding part.

The electronic device may further include a second adhesion layer between the display module and the lower film, wherein the second adhesion layer defines an additional opening that overlaps the first opening, and wherein the first adhesion layer is between the lower film and the plate.

The electronic device may further include a third adhesion layer below the plate, and defining a third opening that overlaps the first holes, and a fourth opening that overlaps the second holes.

The plate may include a stainless steel or a fiber-reinforced composite material.

The electronic device may further include an upper film between the window and the display module, and including a synthetic resin.

DETAILED DESCRIPTION

Figure 1:
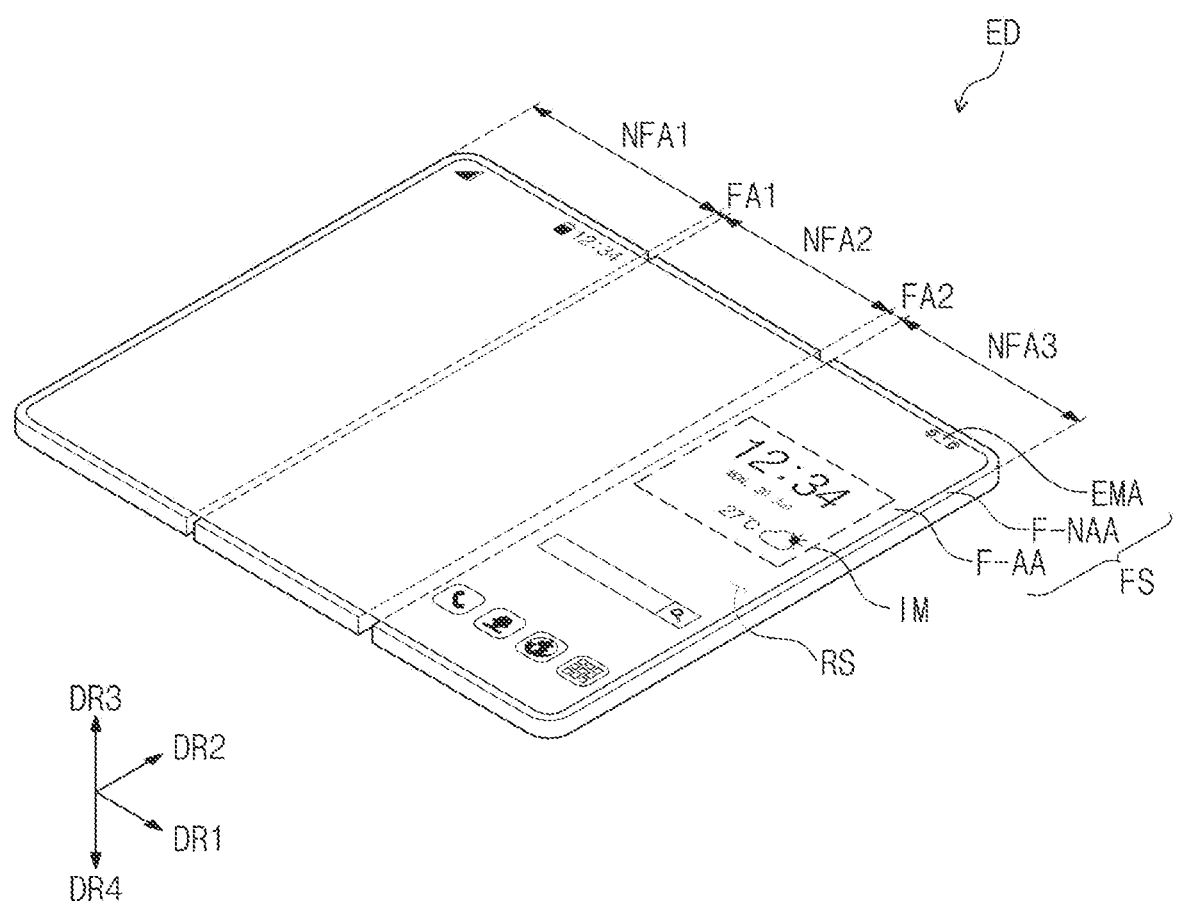
FIG. 1 illustrates an assembled perspective view showing an electronic apparatus according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2A:
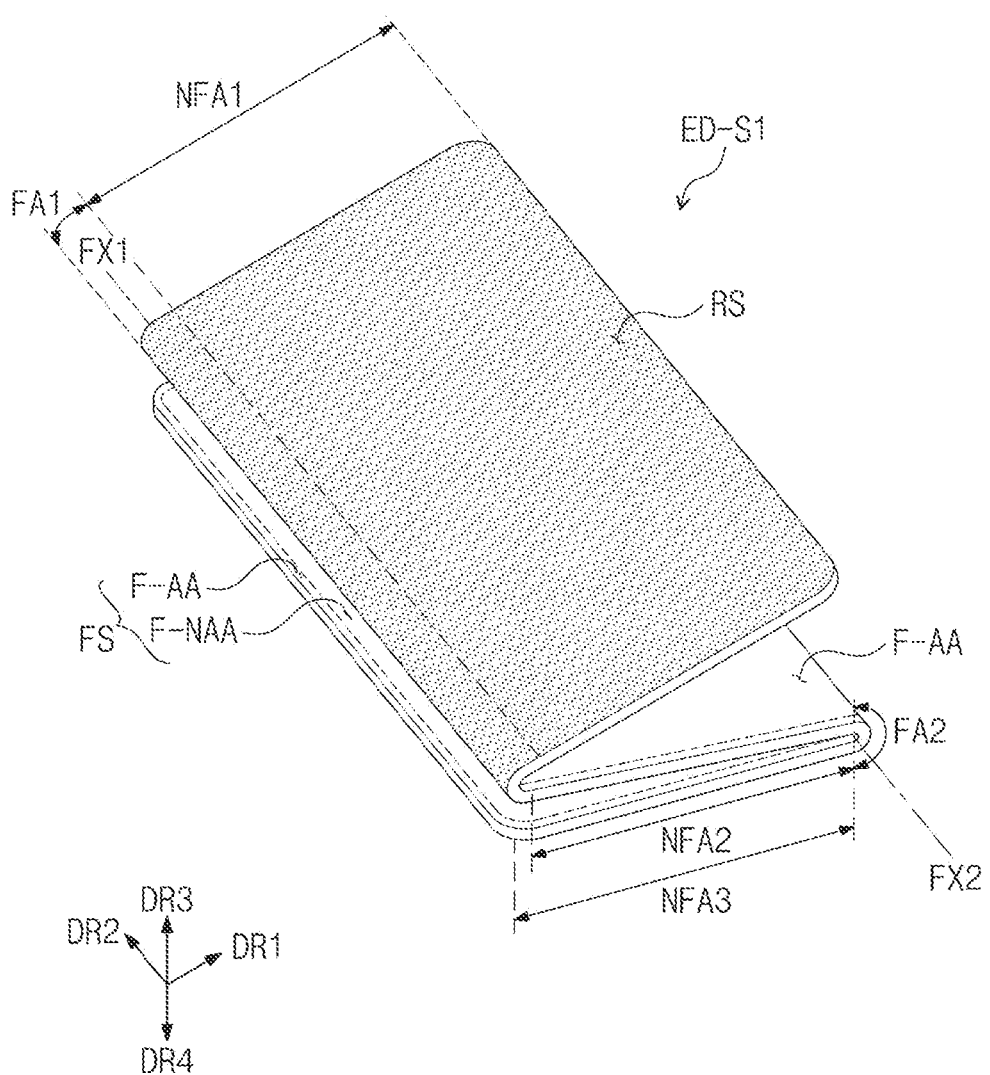
FIG. 2A illustrates a perspective view showing a folded electronic device according to one or more embodiments.
Figure 2B:
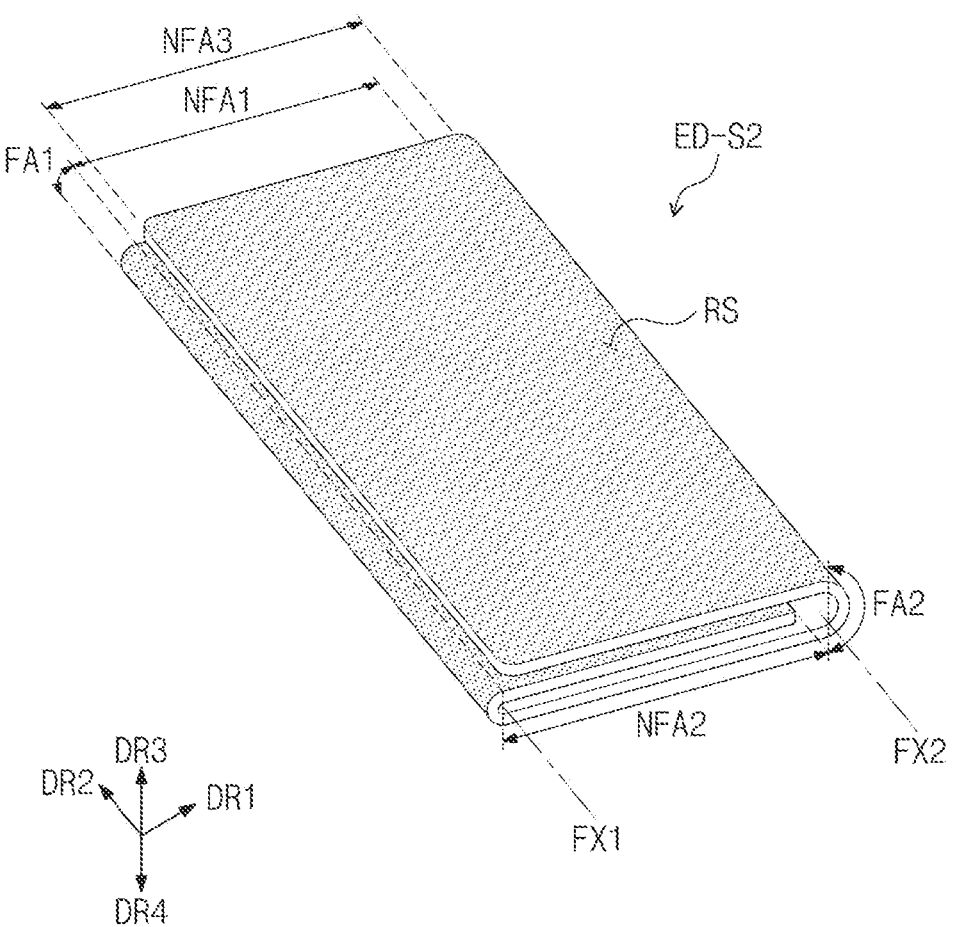
FIG. 2B illustrates a perspective view showing a folded electronic device according to one or more embodiments.

FIG. 1 illustrates an assembled perspective view showing an electronic apparatus according to one or more embodiments. FIG. 2A illustrates a perspective view showing a folded electronic device according to one or more embodiments. FIG. 2B illustrates a perspective view showing a folded electronic device according to one or more embodiments.

An electronic device ED according to one or more embodiments may be an apparatus that is activated with an electrical signal. For example, the electronic device ED may be a mobile phone, a tablet computer, an automotive navigation system, a game console, or a wearable apparatus, but the present disclosure is not limited thereto. In this description, a mobile phone is illustrated by way of example as the electronic device ED.

The following figures including FIG. 1 show first, second, third, and fourth directional axes DR1, DR2, DR3, and DR4, and in this description, directions indicated by the first to fourth directional axes DR1 to DR4 are relative concepts, and may thus be changed to other directions. In the following description, directions designated by the first, second, third, and fourth directional axes DR1, DR2, DR3, and DR4 are respectively described as first, second, third, and fourth directions.

Referring to FIG. 1, the electronic device ED according to one or more embodiments may include a display surface FS parallel to a surface defined by the first direction DR1 and the second direction DR2, which cross each other in an unfolded state of the electronic device ED. The electronic device ED may use the display surface FS to provide users with an image IM. The electronic device ED according to one or more embodiments may display the image IM in the third direction DR3 on the display surface FS, which is parallel to each of the first direction DR1 and the second direction DR2.

In this description, a front surface (or top surface) and a rear surface (bottom surface) of each of components are defined based on a direction along which the image IM is displayed. In this description, the direction along which the image IM is displayed may be the third direction DR3, and the fourth direction DR4 may be defined to indicate a direction opposite to the third direction DR3.

The electronic device ED according to one or more embodiments may detect externally applied inputs. The external input may include various inputs provided from outside the electronic device ED. For example, the external input may not only include touch of a user's hand or other body part, but may include any input (e.g., hovering touch) that approaches or is in the vicinity of the electronic device ED. In addition, the external input may include force, pressure, light, or any of other external inputs.

The electronic device ED may include an active area F-AA and a peripheral area F-NAA. The active area F-AA may be a zone activated with an electric signal. The electronic device ED according to one or more embodiments may display the image IM through the active area F-AA. In addition, the active area F-AA may detect various types of external input. The peripheral area F-NAA is adjacent to the active area F-AA. The peripheral area F-NAA may have a corresponding color.

The active area F-AA may include an electronic module area EMA. Various electronic modules may be located on the electronic module area EMA. For example, the electronic module may include at least one selected from cameras, speakers, optical sensors, and/or thermal sensors. The electronic module area EMA may detect an external object received through the display surface FS, or may externally provide sound signals, such as voices, through the display surface FS. The electronic module may include a plurality of components, and is not limited.

The electronic module area EMA may be surrounded by the active area F-AA and/or the peripheral area F-NAA. The electronic module area EMA may be located in the active area F-AA, but the present disclosure is not limited. In addition, when inactivating the electronic modules located on the electronic module area EMA, the electronic module area EMA may not be visible to users, and a video or image may be displayed on the display surface FS.

The electronic device ED of one or more embodiments may have a rear surface RS opposite to the display surface FS. In one or more embodiments, the rear surface RS may be an outer surface of the electronic device ED, and no video or image may be displayed on the rear surface RS. The present disclosure, however, is not limited thereto, and the rear surface RS may also serve as a display surface on which a video or image is displayed. Moreover, the electronic device ED of one or more embodiments may further include an electronic module area located on the rear surface RS. The electronic module area located on the rear surface RS may include a camera, a speaker, an optical sensor, or the like.

In the electronic device ED of one or more embodiments, the peripheral area F-NAA may surround the active area F-AA. Therefore, a shape of the active area F-AA may be substantially defined by the peripheral area F-NAA. This, however, is illustrated by way of example, and the peripheral area F-NAA may be located adjacent to only one side of the active area F-AA, or may be omitted. The electronic device ED according to one or more embodiments may include the variously shaped active area F-AA, and the present disclosure is not limited.

The electronic device ED of one or more embodiments may include folding regions FA1 and FA2 and non-folding regions NFA1, NFA2, and NFA3. The electronic device ED may include a first non-folding region NFA1, a first folding region FA1, a second non-folding region NFA2, a second folding region FA2, and a third non-folding region NFA3 that are arranged to be spaced apart from each other along the first direction DR1. The first non-folding region NFA1 and the second non-folding region NFA2 may be spaced apart from each other across the first folding region FA1. The second non-folding region NFA2 and the third non-folding region NFA3 may be spaced apart from each other across the second folding region FA2.

In one or more embodiments, the folding regions FA1 and FA2 may correspond to foldable components of the components included in the electronic device ED, and the non-folding regions NFA1, NFA2, and NFA3 may correspond to flat ones of components included in the electronic device ED. Although FIG. 1 depicts that two folding regions FA1 and FA2 are located between three non-folding regions NFA1, NFA2, and NFA3, the present disclosure is not limited thereto, and one of the folding regions FA1 and FA2 may be omitted or at least three folding regions may be provided.

Referring to FIG. 2A, in a folding mode of one or more embodiments, an electronic device ED-S1 may include a first folding region FA1 folded along a first folding axis FX1 that extends along the second direction DR2, and may also include a second folding region FA2 folded along a second folding axis FX2 that extends along the second direction DR2 and is spaced apart in the first direction DR1 from the first folding axis FX1. The present disclosure, however, is not limited thereto, and the first folding axis FX1 and the second folding axis FX2 may be parallel to an arbitrary direction other than the second direction DR2.

In the presently described one or more embodiments, the first folding axis FX1 may be defined on the active area F-AA that overlaps the first folding region FA1. Therefore, the first folding region FA1 may be folded to allow the active area F-AA that overlaps the first non-folding region NFA1 to face the active area F-AA that overlaps the second non-folding region NFA2.

In the presently described one or more embodiments, the second folding axis FX2 may be defined on the rear surface RS that overlaps the second folding region FA2. Therefore, the second folding region FA2 may be folded to allow the rear surface RS that overlaps the second non-folding region NFA2 to face the rear surface RS that overlaps the third non-folding region NFA3.

According to the presently described one or more embodiments, an inner-folding (or in-folding) state may be defined to indicate a state in which a portion of the electronic device ED-S1 is folded along the first folding axis FX1, and an outer-folding (or out-folding) state may be defined to indicate a state in which a portion of the electronic device ED-S1 is folded along the second folding axis FX2. In a folding state, the first folding region FA1 and the second folding region FA2 may have their curvatures that are the same as each other, or different from each other, but the present disclosure is not limited.

Referring to FIG. 2B, in a folding mode of one or more embodiments, an electronic device ED-S2 may include a first folding region FA1 folded along a first folding axis FX1 that extends along the second direction DR2, and may also include a second folding region FA2 folded along a second folding axis FX2 that extends along the second direction DR2, and that is spaced apart in the first direction DR1 from the first folding axis FX1. The present disclosure, however, is not limited thereto, and the first folding axis FX1 and the second folding axis FX2 may be parallel to an arbitrary direction other than the second direction DR2.

In the presently described one or more embodiments, the first folding axis FX1 may be defined on the active area F-AA that overlaps the first folding region FA1. Therefore, the first folding region FA1 may be folded to allow the active area F-AA that overlaps the first non-folding region NFA1 to face the active area F-AA that overlaps the second non-folding region NFA2.

In the presently described one or more embodiments, the second folding axis FX2 may be defined on the active area F-AA that overlaps the second folding region FA2. Therefore, the second folding region FA2 may be folded to allow the rear surface RS that overlaps the first non-folding region NFA1 to face the active area F-AA that overlaps the third non-folding region NFA3.

According to the presently described one or more embodiments, an inner-folding state may be defined to indicate a state in which a portion of the electronic device ED-S2 is folded along one or both of the first direction DR1 and the second direction DR2. In a folding state, the first folding region FA1 and the second folding region FA2 may have their curvatures that are the same as each other, or different from each other, but the present disclosure is not limited.

Figure 3A:
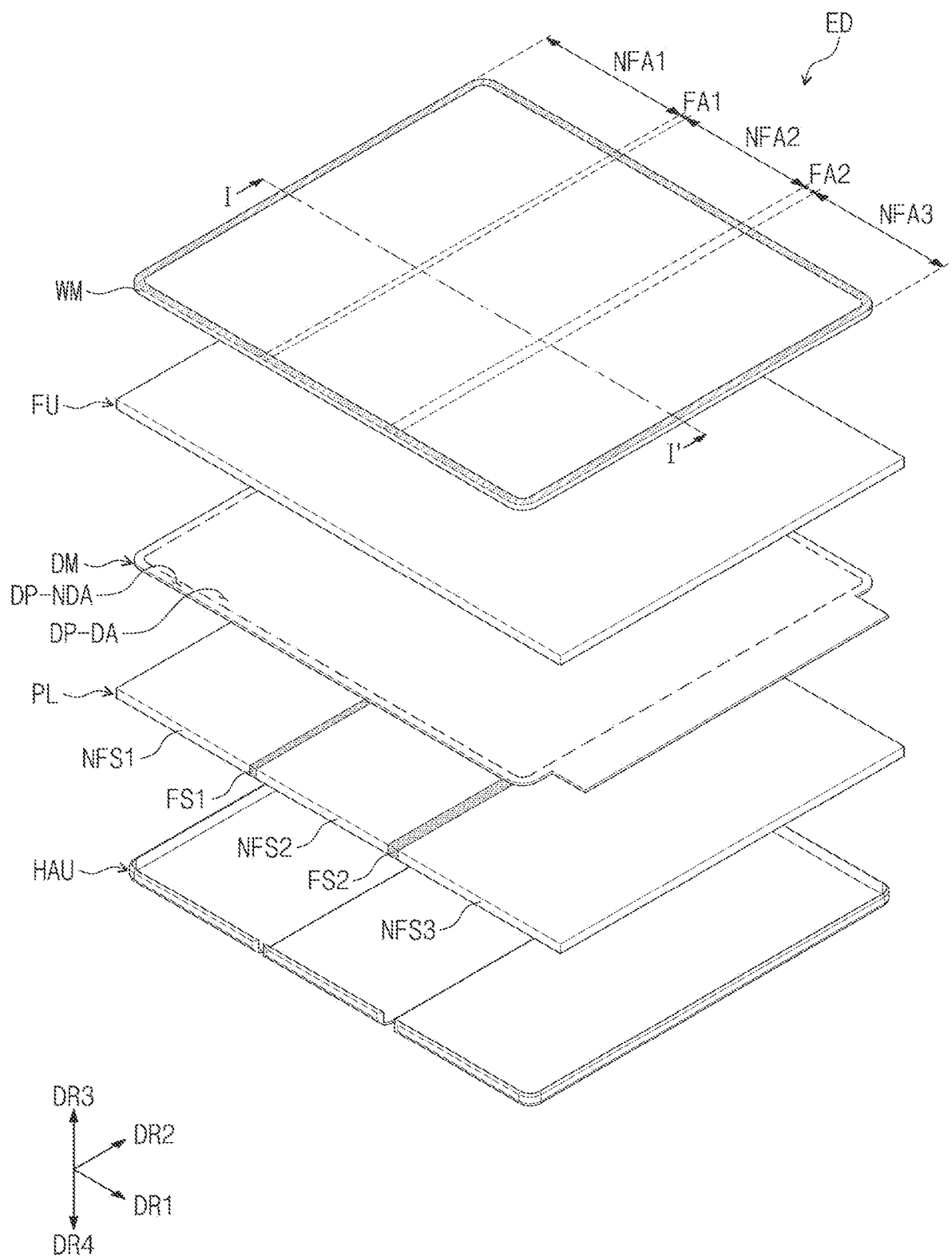
FIG. 3A illustrates an exploded perspective view showing an electronic device according to one or more embodiments.
Figure 3B:
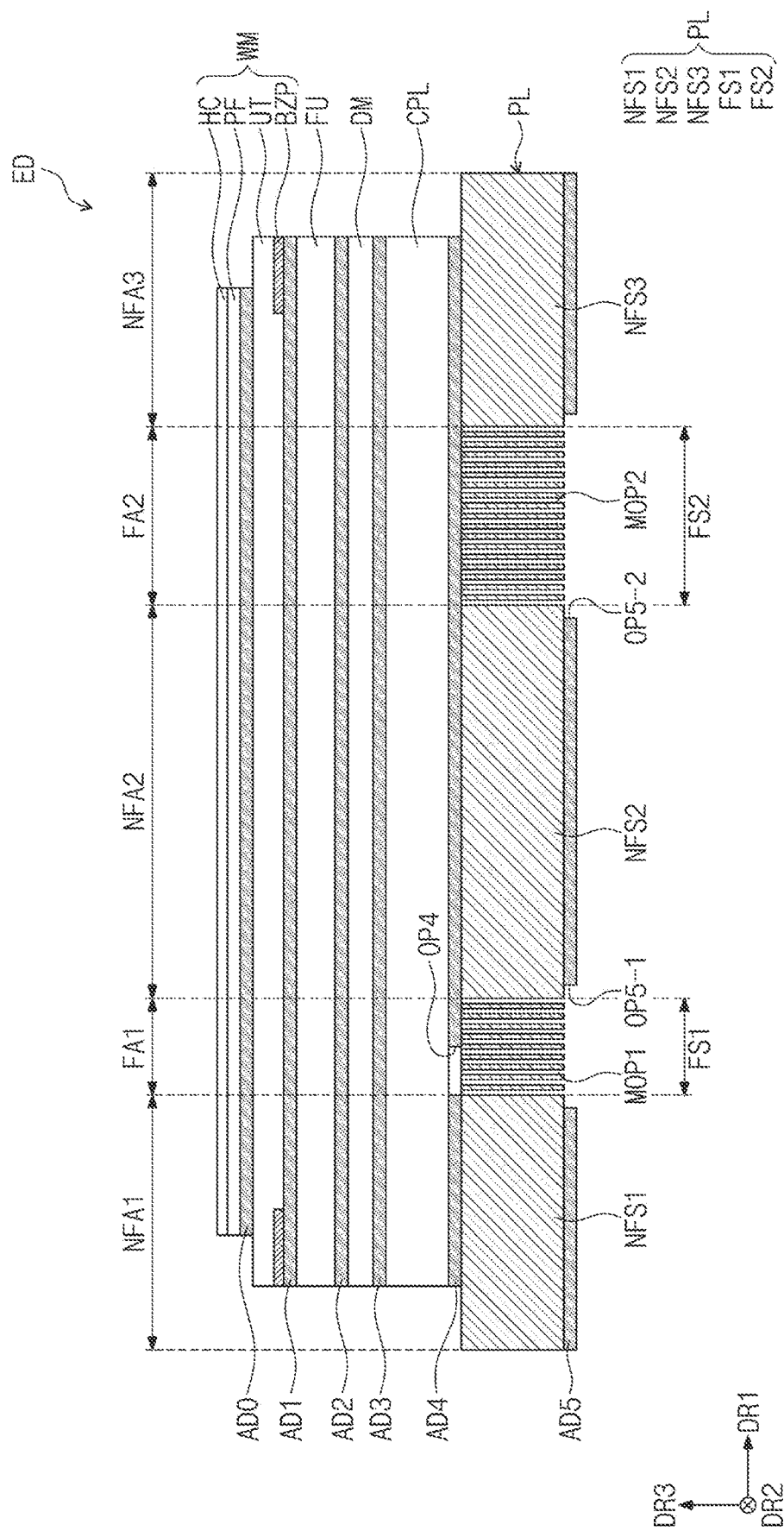
FIG. 3B illustrates a cross-sectional view showing an electronic device according to one or more embodiments.
Figure 3C:
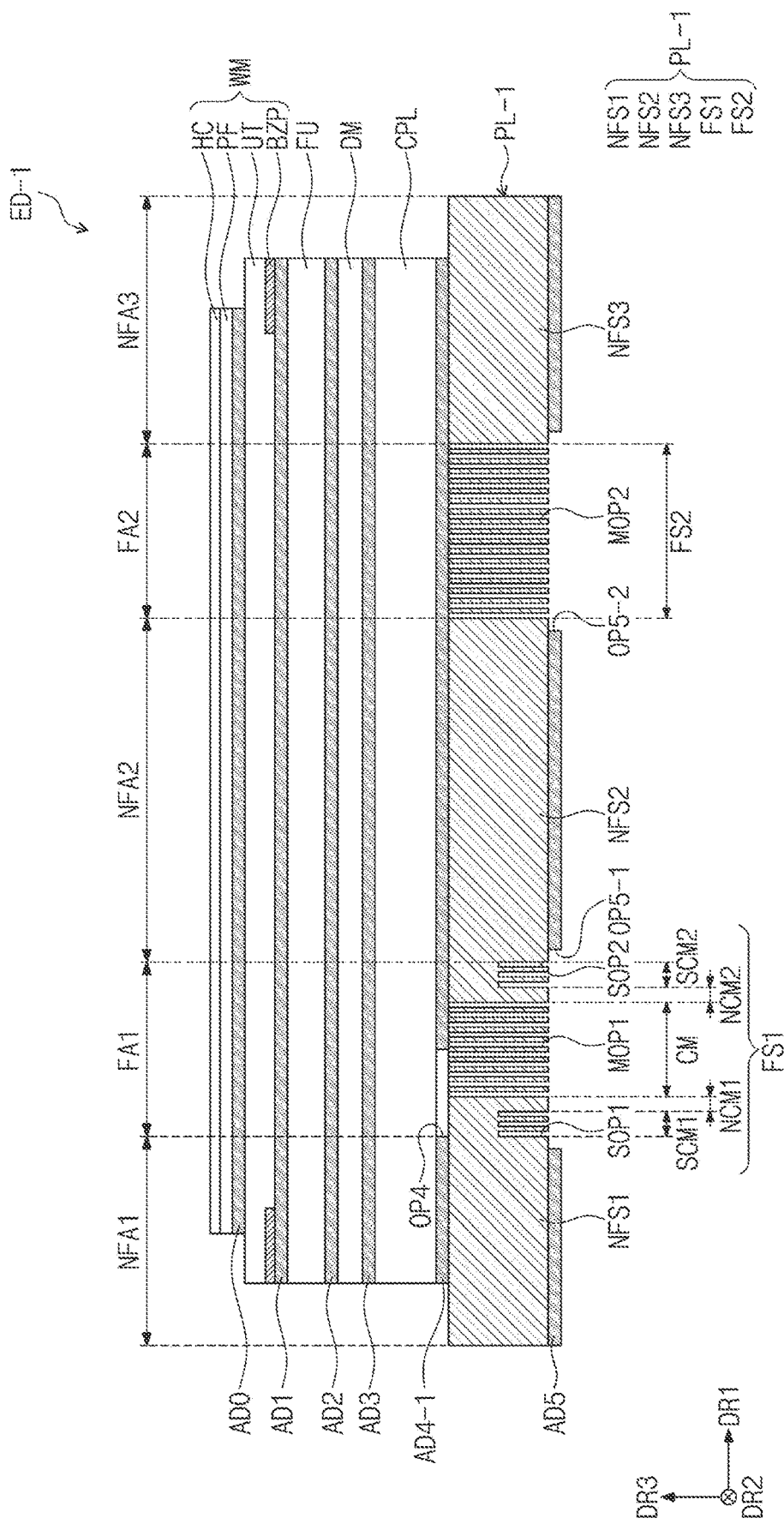
FIG. 3C illustrates a cross-sectional view showing an electronic device according to one or more embodiments.
Figure 3D:
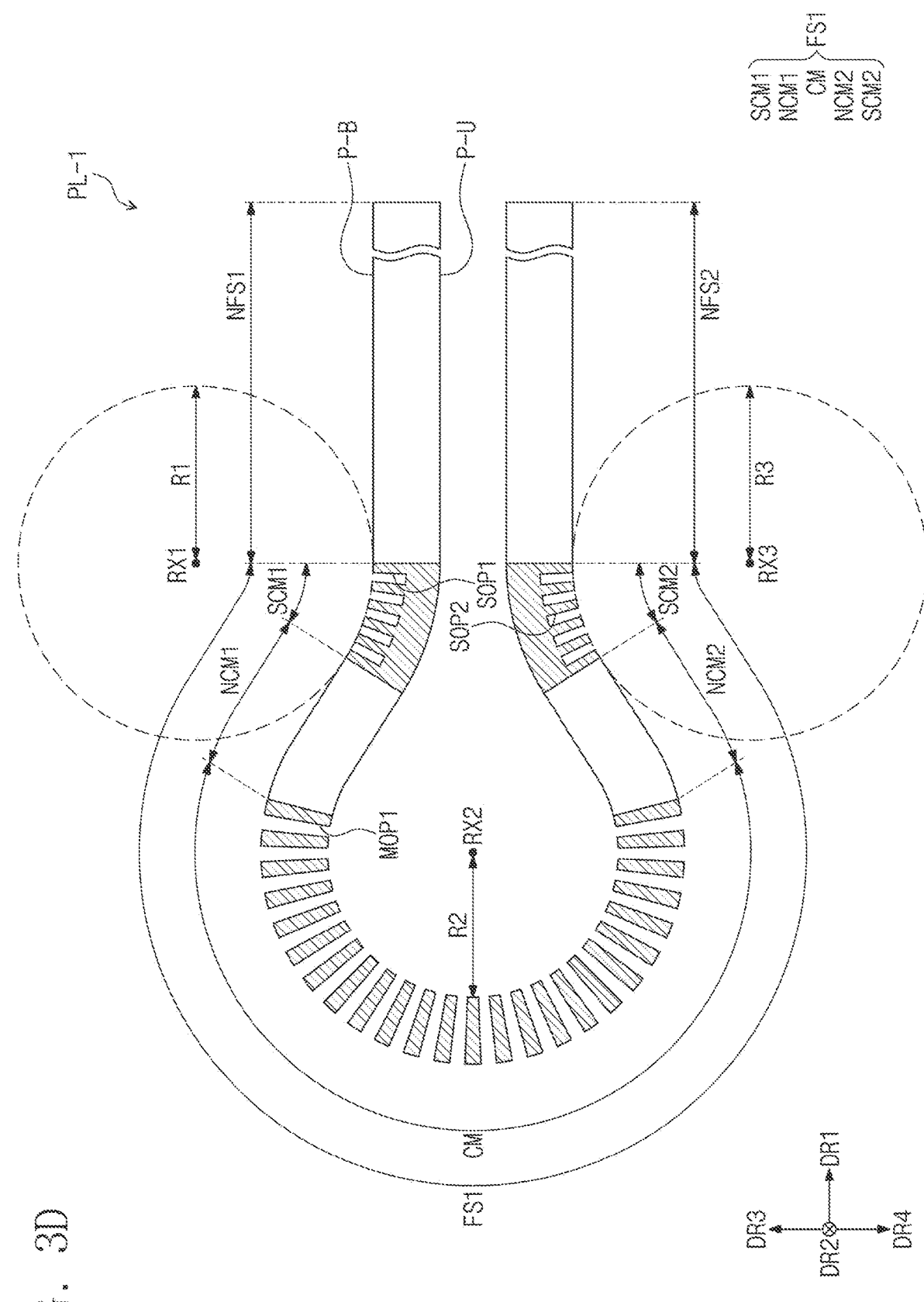
FIG. 3D illustrates a cross-sectional view showing a folded plate according to one or more embodiments.

FIG. 3A illustrates an exploded perspective view showing an electronic device according to one or more embodiments. FIG. 3B illustrates a cross-sectional view showing an electronic device according to one or more embodiments. FIG. 3C illustrates a cross-sectional view showing an electronic device according to one or more embodiments. FIG. 3D illustrates a cross-sectional view showing a folded plate according to one or more embodiments.

Referring to FIGS. 3A and 3B, the electronic device ED of one or more embodiments may include a window WM, an upper film FU, a display module DM, a lower film CPL, a plate PL, and a housing HAU. The electronic device ED may include adhesion layers AD0, AD1, AD2, AD3, AD4, and AD5 that are located between respective components to couple adjacent components to each other.

The electronic device ED of one or more embodiments may further include a hinge member that guides a folding state. The hinge member may be located below the plate PL. FIG. 3A omits illustration of the electronic module area EMA and the electronic modules located below the electronic module area EMA discussed in FIG. 1.

The window WM may be located on the display module DM. The window WM may cover an entire top surface of the display module DM. The window WM may include an optically transparent dielectric material.

The window WM may include a thin glass substrate UT, a window protection layer PF located on the thin glass substrate UT, and a bezel pattern BZP. The window WM according to one or more embodiments may further include a functional layer HC located on the window protection layer PF.

The window protection layer PF and the thin glass substrate UT may be coupled to each other through an adhesion layer AD0. The adhesion layer AD0 may include one of a pressure sensitive adhesive film (PSA) and an optically clear adhesive (OCA). In the following description, an adhesion layer may include one of a pressure sensitive adhesive film (PSA) and an optically clear adhesive (OCA), and a repetitive explanation will be omitted.

The window protection layer PF may be located on the thin glass substrate UT. The window protection layer PF may protect the thin glass substrate UT.

The window protection layer PF may include a synthetic resin film. The synthetic resin film of the window protection layer PF may include polyimide, polycarbonate, polyamide, triacetylcellulose, polymethylmethacrylate, or polyethylene terephthalate.

The functional layer HC may be located on the window protection layer PF. The functional layer HC may include at least one selected from a hard-coating layer, an anti-fingerprint layer, and/or an antireflective layer. When the functional layer HC includes a hard-coating layer, the functional layer HC may have a thickness ranging from about 3 μm to about 10 μm.

The thin glass substrate UT may be located below the window protection layer PF. The thin glass substrate UT may have a thickness ranging from about 25 μm to about 100 μm. The thin glass substrate UT may be a chemically strengthened glass. Even when the thin glass substrate UT repeats its folding and unfolding operations, the thin glass substrate UT may reduce, minimize, or prevent the occurrence of wrinkles.

The bezel pattern BZP may overlap the peripheral area F-NAA depicted in FIG. 1. The bezel pattern BZP may be located on a rear surface of the thin glass substrate UT. FIG. 3B depicts, by way of example, the bezel pattern BZP located on the rear surface of the thin glass substrate UT. The present disclosure is not limited thereto, and the bezel pattern BZP may be located between the window protection layer PF and the thin glass substrate UT. The bezel pattern BZP may be a colored light-shield layer formed by, for example, a coating method. The bezel pattern BZP may include a base material and a dye or pigment mixed in the base material.

The window WM and the upper film FU may be coupled to each other through a first adhesion layer AD1.

The upper film FU may be located between the window WM and the display module DM. The upper film FU may adsorb impact applied to a front surface of the electronic device ED. The upper film FU may include a synthetic resin film. The synthetic resin film may include polyimide, polycarbonate, polyamide, triacetyl cellulose, polymethylmethacrylate, or polyethylene terephthalate. In one or more embodiments, the upper film FU may be omitted.

The upper film FU and the display module DM may be coupled to each other through a second adhesion layer AD2.

The display module DM may be located below the window WM. The display module DM may be flexible. The display module DM may include a display area DP-DA and a non-display area DP-NDA that respectively correspond to the active area F-AA and the peripheral area F-NAA of the electronic device ED depicted in FIG. 1.

The display module DM may include a display panel that displays an image, and an input sensor that detects an external input. The display panel may be an emissive display panel, but the present disclosure is not particularly limited thereto. For example, the display panel may be an organic light-emitting display panel or a quantum-dot light-emitting display panel. An emission layer of the organic light-emitting display panel may include an organic light-emitting material. An emission layer of the inorganic light-emitting display panel may include a quantum-dot or a quantum-rod.

The display panel may include a plurality of emission elements. The emission elements may be located on the display area DP-DA, and may emit corresponding colors. When the emission layer is provided in plural, the emission elements may correspond to the emission layers. Alternatively, when the emission layer is provided as a single layer, the emission elements may respectively correspond to color filters or color conversion members.

The input sensor may be located on the display panel. The input sensor may operate in a capacitive manner. The input sensor may detect a position and/or strength of a user's hand over a front surface of the display area DP-DA. The input sensor may be formed on the display panel by a series of processes. In this case, it may be expressed that the input sensor is directly located on the display panel. The phrase "directly located" may mean that no component is located between the input sensor and the display panel. For example, no adhesive member may be separately located between the input sensor and the display panel.

The display module DM and the lower film CPL may be coupled to each other through a third adhesion layer AD3.

The lower film CPL may be located below the display module DM. The lower film CPL may have a corresponding color. The lower film CPL may reduce or prevent an optical transparency of a rear surface of the display module DM, while protecting the rear surface of the display module DM. The lower film CPL may be formed of a material whose light absorption is high. The lower film CPL may include a flexible synthetic resin film. For example, the lower film CPL may include polyethylene terephthalate.

The lower film CPL may be coupled to the plate PL through a fourth adhesion layer AD4. The fourth adhesion layer AD4 according to the presently described one or more embodiments may include/define an opening OP4 (which may be referred to as a first opening in the claims) that overlaps the first folding region FA1, and that partially exposes the plate PL and the lower film CPL.

The plate PL may be located below the display module DM to protect the display module DM against external impact. In one or more embodiments, the plate PL may include a metallic material or a polymeric material. For example, the plate PL may be formed of a stainless steel, aluminum, or any alloy thereof. According to one or more embodiments, the plate PL may include a fiber-reinforced composite material. The plate PL may include a reinforced fiber located in a matrix portion. The reinforced fiber may be a carbon fiber or a glass fiber. The matrix portion may include a polymer resin. The matrix portion may include a thermoplastic resin. For example, the matrix portion may include a polyamide-based resin or a polypropylene-based resin. For example, the fiber-reinforced composite material may include a carbon-fiber-reinforced plastic (CFRP) or a glass-fiber-reinforced plastic (GFRP).

The plate PL may include folding parts FS1 and FS2 and non-folding parts NFS1, NFS2, and NFS3. A first folding part FS1 may overlap the first folding region FA1, and a second folding part FS2 may overlap the second folding region FA2. A width in the first direction DR1 of the first folding part FS1 may be less than a width in the first direction DR1 of the second folding part FS2.

The first folding part FS1 may include a plurality of first holes MOP1. The first holes MOP1 may be formed to penetrate in the third direction DR3 through the first folding part FS1. The first folding part FS1 except the first holes MOP1 may have a slit shape/pattern in plan view.

The second folding part FS2 may include a plurality of second holes MOP2. The second holes MOP2 may be formed to penetrate in the third direction DR3 through the second folding part FS2. The second folding part FS2 except the second holes MOP2 may have a slit shape/pattern in plan view.

A first non-folding part NFS1 may overlap the first non-folding region NFA1, a second non-folding part NFS2 may overlap the second non-folding region NFA2, and a third non-folding part NFS3 may overlap the third non-folding region NFA3.

According to one or more embodiments, the opening OP4 defined in the fourth adhesion layer AD4 may at least partially overlap the first folding part FS1 and only some of the first holes MOP1. Therefore, the first holes MOP1 that overlap the opening OP4 may be exposed from the fourth adhesion layer AD4 through the opening OP4. For example, the opening OP4 may extend from an area over one of the first holes MOP1 nearest the first non-folding part NFS1 to an area over one of the first holes MOP1 that overlaps a center of, or a region near the center of, the first folding part FS1.

A fifth adhesion layer AD5 may be located below the plate PL. The plate PL may be coupled through the fifth adhesion layer AD5 to the hinge member that guides a folding operation. The fifth adhesion layer AD5 according to one or more embodiments may include/define a first opening OP5-1 (which may be referred to as a third opening in the claims), which overlaps the first folding part FS1, and may also include/define a second opening OP5-2 (which may be referred to as a fourth opening in the claims), which overlaps the second folding part FS2.

According to the presently described one or more embodiments, as the fourth adhesion layer AD4 and the fifth adhesion layer AD5 respectively include/define the openings OP4, OP5-1, and OP5-2 that overlap corresponding ones of the folding parts FS1 and FS2, even when the folding parts FS1 and FS2 are repeatedly folded, it may be possible to reduce stress applied to the fourth adhesion layer AD4 and the fifth adhesion layer AD5 that overlap the folding parts FS1 and FS2. Accordingly, the electronic device ED may have improved folding properties.

The electronic device ED according to one or more embodiments may further include a lower support member located below the plate PL. The lower support member may include at least one selected from a support layer, a cushion layer, a shield layer, and/or an interlayer bonding layer.

The housing HAU and the window WM may be coupled to each other to define an appearance of the electronic device ED. The housing HAU may provide a space capable of receiving the display module DM, the plate PL, the upper film FU, the lower film CPL, the hinge member, and the electronic module.

Referring to FIG. 3C, the electronic device ED-1 according to one or more embodiments may include a window WM, an upper film FU, a display module DM, a lower film CPL, a plate PL-1, and a housing HAU. The electronic device ED-1 may include adhesion layers AD0, AD1, AD2, AD3, AD4-1, and AD5 that are located between respective components to couple adjacent components to each other. A description of the window WM, the upper film FU, the display module DM, the housing HAU, and the adhesion layers AD0, AD1, AD2, AD3, and AD5 may correspond to that discussed in the electronic device ED of FIG. 3A.

The plate PL-1 may include folding parts FS1 and FS2 and non-folding parts NFS1, NFS2, and NFS3. A first folding part FS1 may overlap the first folding region FA1, and a second folding part FS2 may overlap the second folding region FA2. In one or more embodiments, a width in the first direction DR1 of the first folding part FS1 may be less than a width in the first direction DR1 of the second folding part FS2.

Referring to FIGS. 3C and 3D, the first folding part FS1 according to one or more embodiments may include a first side curvature part SCM1, a first flat part NCM1, a main curvature part CM, a second flat part NCM2, and a second side curvature part SCM2. The first side curvature part SCM1 may extend from the first non-folding part NFS1, and the second side curvature part SCM2 may extend from the second non-folding part NFS2.

The main curvature part CM may be located between, and spaced apart from, the first side curvature part SCM1 and the second side curvature part SCM2. The first flat part NCM1 may be located between the first side curvature part SCM1 and the main curvature part CM, and the second flat part NCM2 may be located between the second side curvature part SCM2 and the main curvature part CM.

The plate PL-1 may include main holes MOP1 (which may be referred to as first holes in the claims) that overlap the main curvature part CM, and that penetrate from top to bottom surfaces P-U and P-B of the plate PL-1.

The plate PL-1 may include first side holes SOP1 that overlap the first side curvature part SCM1, and that partially penetrate in a thickness direction of the plate PL-1 from the bottom surface P-B of the plate PL-1.

In addition, the plate PL-1 may include second side holes SOP2 that overlap the second side curvature part SCM2, and that partially penetrate in the thickness direction of the plate PL-1 from the bottom surface P-B of the plate PL-1.

When the electronic device ED-1 is folded in a folding mode, the first side curvature part SCM1 of the first folding part FS1 may be folded with a first curvature radius R1 along a first axis RX1 to thereby have a first curvature. The main curvature part CM may be folded with a second curvature radius R2 along a second axis RX2 to thereby have a second curvature, and the second side curvature part SCM2 may be folded with a third curvature radius R3 along a third axis RX3 to thereby have a third curvature. According to one or more embodiments, the first curvature and the third curvature may correspond to each other, and the first curvature may be less than the second curvature.

A center of curvature of the main curvature part CM may be defined on the top surface P-U of the plate PL-1. Therefore, a center of curvature of the main curvature part CM may be defined on a top surface of the window WM. A center of curvature of each of the first and second side curvature parts SCM1 and SCM2 may be defined on the bottom surface P-B of the plate PL-1. Therefore, the center of curvature of each of the first and second side curvature parts SCM1 and SCM2 may be defined on a bottom surface of the window WM.

According to one or more embodiments, as the first folding part FS1 includes the holes MOP1, SOP1, and SOP2, which are included in the main curvature part CM, and also includes the first side curvature part SCM1 and the second side curvature part SCM2, a shape of the first folding part FS1 may be suitably changed in a folding mode.

In addition, as the main curvature part CM, the first side curvature part SCM1, and the second side curvature part SCM2 are folded in different directions from each other, the first and second non-folding parts NFS1 and NFS2 of the plate PL-1 may be located considerably adjacent to each other when the electronic device ED-1 is in a folding mode, and thus the electronic device ED-1 may be folded in an inner-folding manner to allow the first and second non-folding regions NFA1 and NFA2 of the plate PL-1 to be relatively quite close to each other. Accordingly, the electronic device ED-1 may become slimmer in a folding state.

Figure 4:
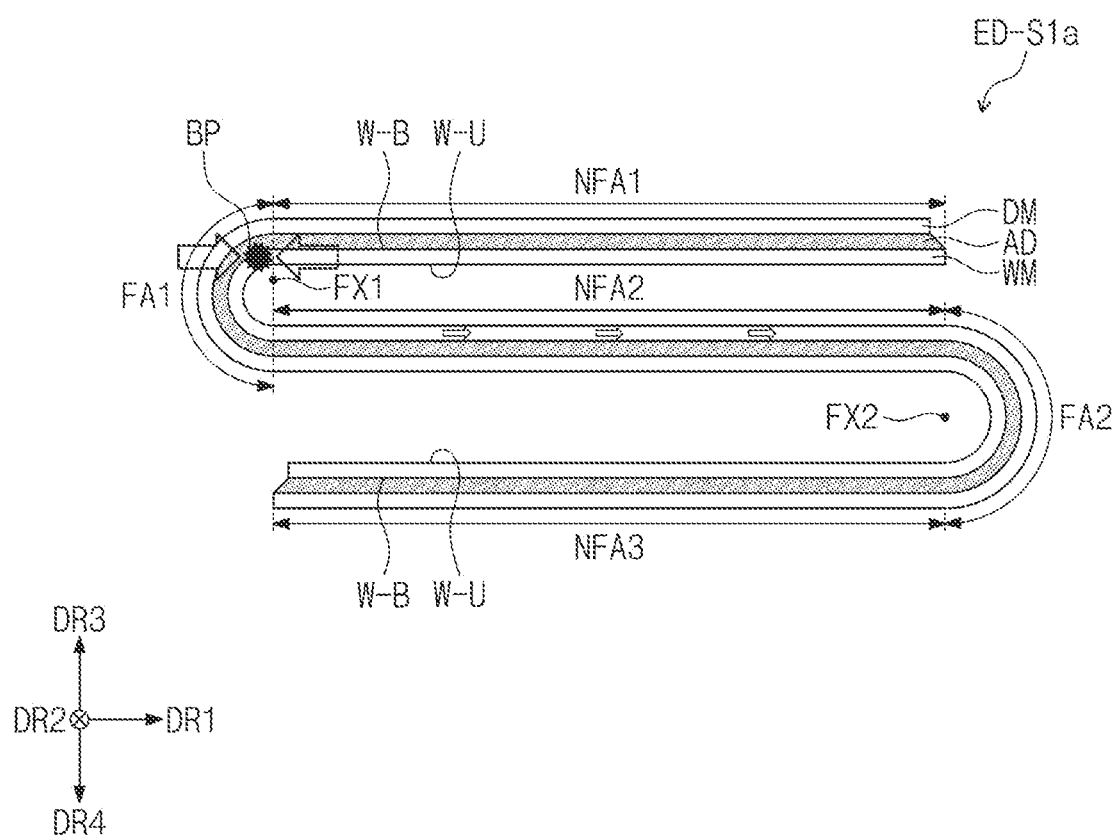
FIG. 4 illustrates a cross-sectional view showing a folded electronic device according to one or more embodiments.
Figure 5:
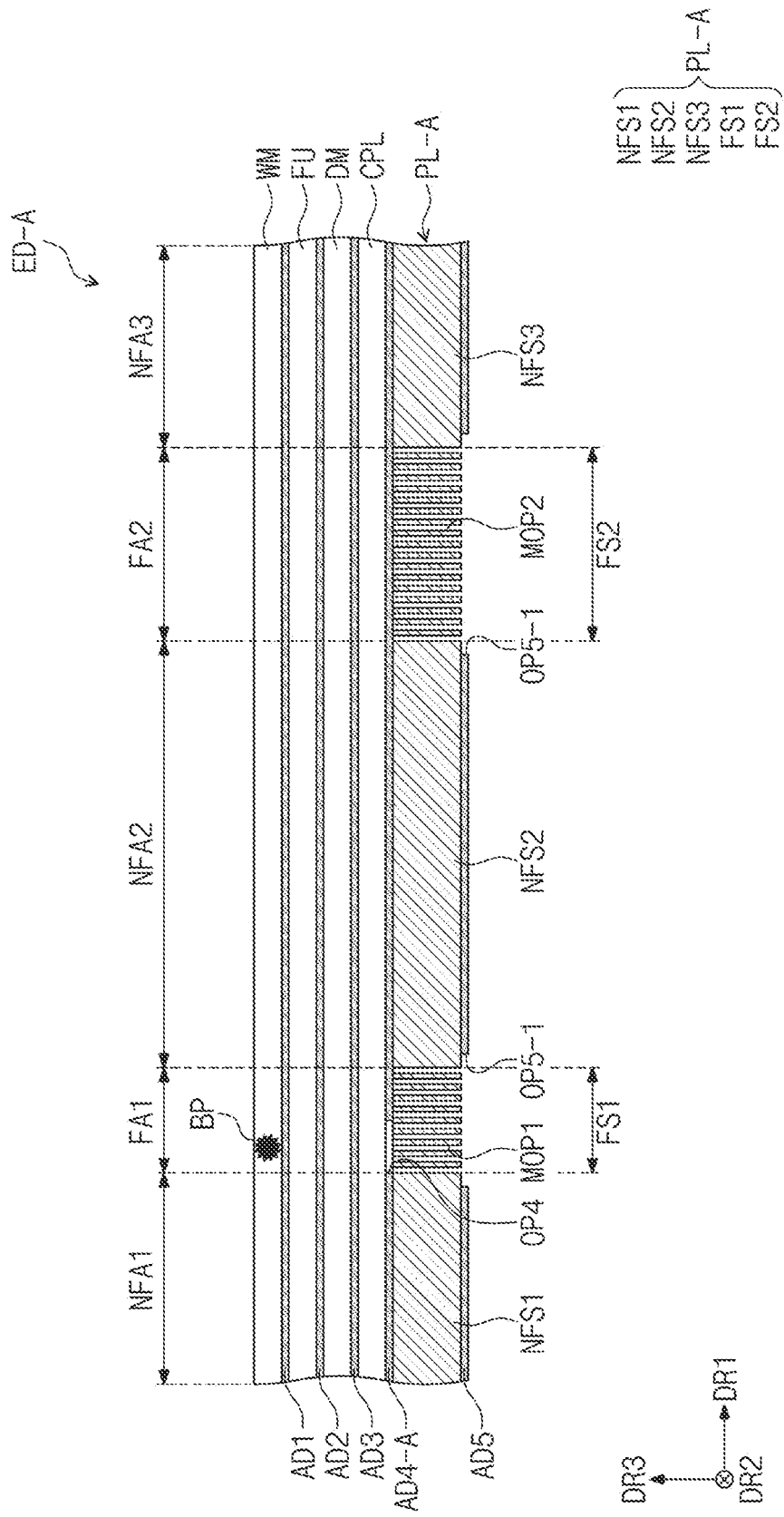
FIG. 5 illustrates a cross-sectional view showing an electronic device according to one or more embodiments.

FIG. 4 illustrates a cross-sectional view showing a folded electronic device according to one or more embodiments. FIG. 5 illustrates a cross-sectional view showing an electronic device according to one or more embodiments. The same or similar reference numerals are allocated to components that are the same as or similar to those discussed in FIGS. 1 to 3D, and a repetitive description will be omitted.

FIG. 4 depicts the window WM, the display module DM, and an adhesion layer AD located between the window WM and the display module DM among the components of FIGS. 3A and 3B, and other components will be omitted for convenience of description.

An electronic device ED-S1a according to the presently described one or more embodiments may be folded in the same manner as that of the electronic device ED-S1 discussed in FIG. 2A.

Referring to FIG. 4, the electronic device ED-S1a according to one or more embodiments may be in-folded in a folding mode such that the first folding part (see FS1 of FIG. 3A) is folded in an inner-folding manner along the first folding axis FX1. Therefore, a top surface W-U of the window WM that overlaps the first non-folding region NFA1 may face a top surface W-U of the window WM that overlaps the second non-folding region NFA2.

The electronic device ED-S1a may be out-folded in a folding mode such that the second folding part (see FS2 of FIG. 3A) is folded in an outer-folding manner along the second folding axis FX2. Therefore, a bottom surface W-B of the window WM that overlaps the second non-folding region NFA2 may face a bottom surface W-B of the window WM that overlaps the third non-folding region NFA3. In this case, a curvature of the first folding part FS1 may be greater than that of the second folding part FS2.

When the electronic device ED-S1a is folded, the adhesion layers AD may be placed between respective components to securely obtain decoupling characteristics between stacked components of the electronic device ED-S1a. Therefore, when the electronic device ED-S1a is in a folding operation, the window WM and the display module DM may be shifted some distance with respect to each other via the adhesion layer AD, and thus, an end of the window WM and an end of the display module DM may be spaced apart from each other in a folding state. An increase in thickness of the adhesion layer AD located between components may induce an improvement in decoupling characteristics. However, when the thickness of the adhesion AD is increased, a buckling phenomenon may occur at a location that overlaps the folding parts FS1 and FS2. In one or more embodiments, the buckling phenomenon may occur at the window WM to which maximum or relatively high compressive stress is applied in a folding state. The term "bucking phenomenon BP," which will be discussed in the following drawings, may be defined to indicate a location in the window WM to which maximum or relatively high compressive stress is applied in a folding state or an abnormal bending or distortion at the location in the window WM.

In a folding mode of the electronic device ED-S1a according to the presently described one or more embodiments, the window WM on the first folding region FA1 may experience a buckling phenomenon BP at a corresponding point that is adjacent to the first non-folding region NFA1.

For example, when the electronic device ED-S1a is folded, a portion of the window WM that is adjacent to the second non-folding region NFA2, and that is on the first folding region FA1, may have an allowance space capable of being shifted a corresponding distance toward the second non-folding region NFA2, the second folding region FA2, and the third non-folding region NFA3. However, a portion of the window WM that is adjacent to the first non-folding region NFA1 and that is on the first folding region FA1 may have a relatively deficient allowance space capable of being shifted because an end of the first non-folding part NFS1 is coupled through the adhesion layer AD to an end of the display module DM. Accordingly, in a folding mode of the electronic device ED-S1a according to the presently described one or more embodiments, a buckling phenomenon BP may occur at the window WM on the first folding region FA1 at an area of the window WM that is adjacent to the first non-folding region NFA1.

An illustration of an electronic device ED-A that will be discussed with respect to FIG. 5 may correspond to the cross section of the electronic device ED-S1a discussed in FIG. 4. Therefore, in a folding mode, the electronic device ED-A may be folded in the same operating state as that of the electronic device ED-S1 discussed in FIG. 2A, and components included in the electronic device ED-A may correspond to those of included in the electronic device ED discussed in FIG. 3B.

In a folding mode, the electronic device ED-A may experience a buckling phenomenon BP at a corresponding point of the window WM that overlaps the first folding region FA1. For example, the window WM on the first folding region FA1 may experience a buckling phenomenon BP at a corresponding point adjacent to the first non-folding region NFA1.

Referring to FIG. 5, the electronic device ED-A according to one or more embodiments may include a window WM, an upper film FU, a display module DM, a lower film CPL, a plate PL-A, and a housing (see HAU of FIG. 3A). The electronic device ED-A may include adhesion layers AD1, AD2, AD3, AD4-A, and AD5 that are located between respective components to couple adjacent components to each other. A description of the window WM, the upper film FU, the display module DM, the lower film CPL, the adhesion layers AD1, AD2, AD3, and AD5 may correspond to that discussed in the electronic device ED of FIG. 3A.

The plate PL-A may include folding parts FS1 and FS2 and non-folding parts NFS1, NFS2, and NFS3. A first folding part FS1 may overlap the first folding region FA1, and a second folding part FS2 may overlap the second folding region FA2. A width in the first direction DR1 of the first folding part FS1 may be less than a width in the first direction DR1 of the second folding part FS2.

The first folding part FS1 may include a plurality of first holes MOP1. The first holes MOP1 may be formed to penetrate in the third direction DR3 through the first folding part FS1. The first folding part FS1 except the first holes MOP1 may have a slit shape/pattern in plan view.

The second folding part FS2 may include a plurality of second holes MOP2. The second holes MOP2 may be formed to penetrate in the third direction DR3 through the second folding part FS2. The second folding part FS2 except the second holes MOP2 may have a slit shape/pattern in plan view.

A first non-folding part NFS1 may overlap the first non-folding region NFA1, a second non-folding part NFS2 may overlap the second non-folding region NFA2, and a third non-folding part NFS3 may overlap the third non-folding region NFA3.

In one or more embodiments, the window WM on the first folding region FA1 may experience a buckling phenomenon BP at a corresponding point adjacent to the first non-folding region NFA1.

The lower film CPL may be coupled to the plate PL through a fourth adhesion layer AD4-A. The fourth adhesion layer AD4-A may include/define an opening OP4 (which may be referred to as a first opening in claims) that overlaps the first folding region FA1 and that partially exposes the plate PL-A and the lower film CPL.

According to one or more embodiments, the opening OP4 defined in the fourth adhesion layer AD4-A may overlap the first folding part FS1 and only some of the first holes MOP1. Therefore, the first holes MOP1 that overlap the opening OP4 may be exposed from the fourth adhesion layer AD4-A through the opening OP4. For example, the opening OP4 may extend from an area over one of the first holes MOP1 nearest the first non-folding part NFS1 to an area over one of the first holes MOP1 that overlaps a center of, or a region near the center of, the first folding part FS1.

According to the presently described one or more embodiments, in a folding mode of the electronic device ED-A, the opening OP4 defined in the fourth adhesion layer AD4-A may overlap a location at which a buckling phenomenon BP occurs. As the opening OP4 is formed at a location to which maximum or relatively high compressive stress is applied when the first folding part FS1 is folded in a folding mode, the compressive stress that is applied to the portion of the window WM that overlaps the opening OP4 may be reduced. Therefore, it may be possible to reduce or prevent the occurrence of bucking issues, and to obtain the characteristics for reducing buckling. Accordingly, the electronic device ED-A may exhibit improved folding properties.

Figure 6:
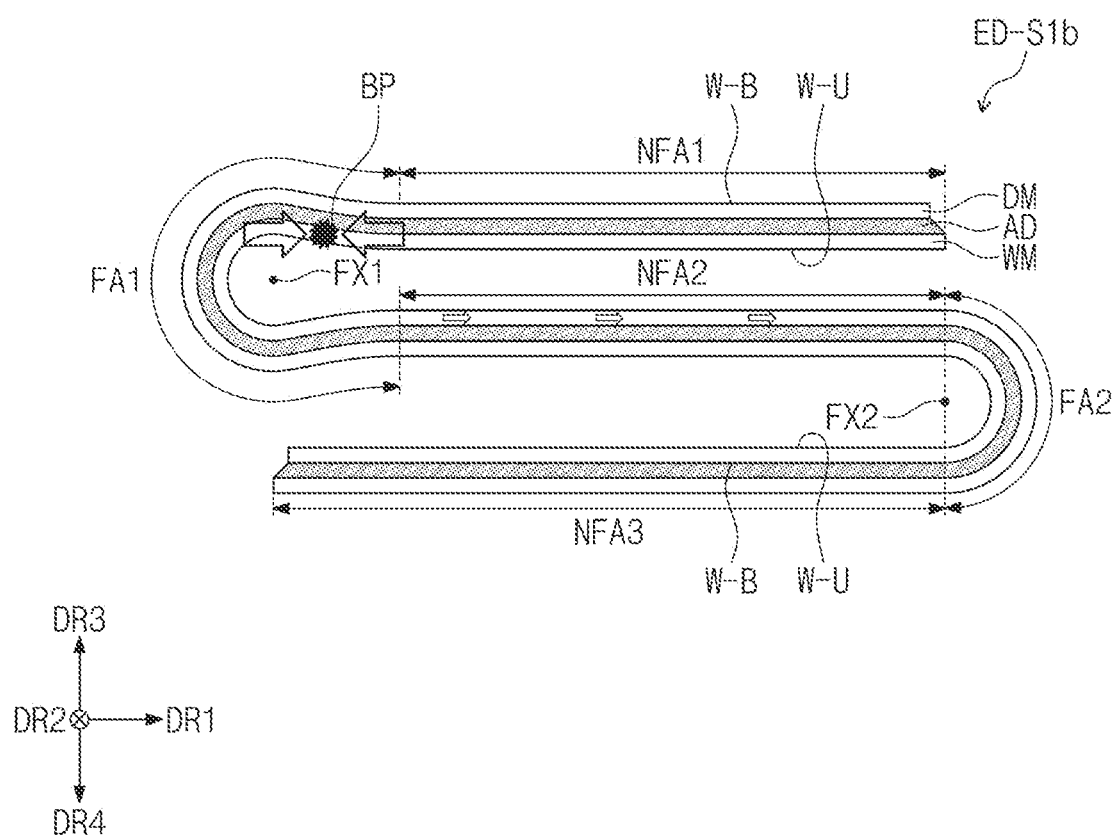
FIG. 6 illustrates a cross-sectional view showing a folded electronic device according to one or more embodiments.
Figure 7:
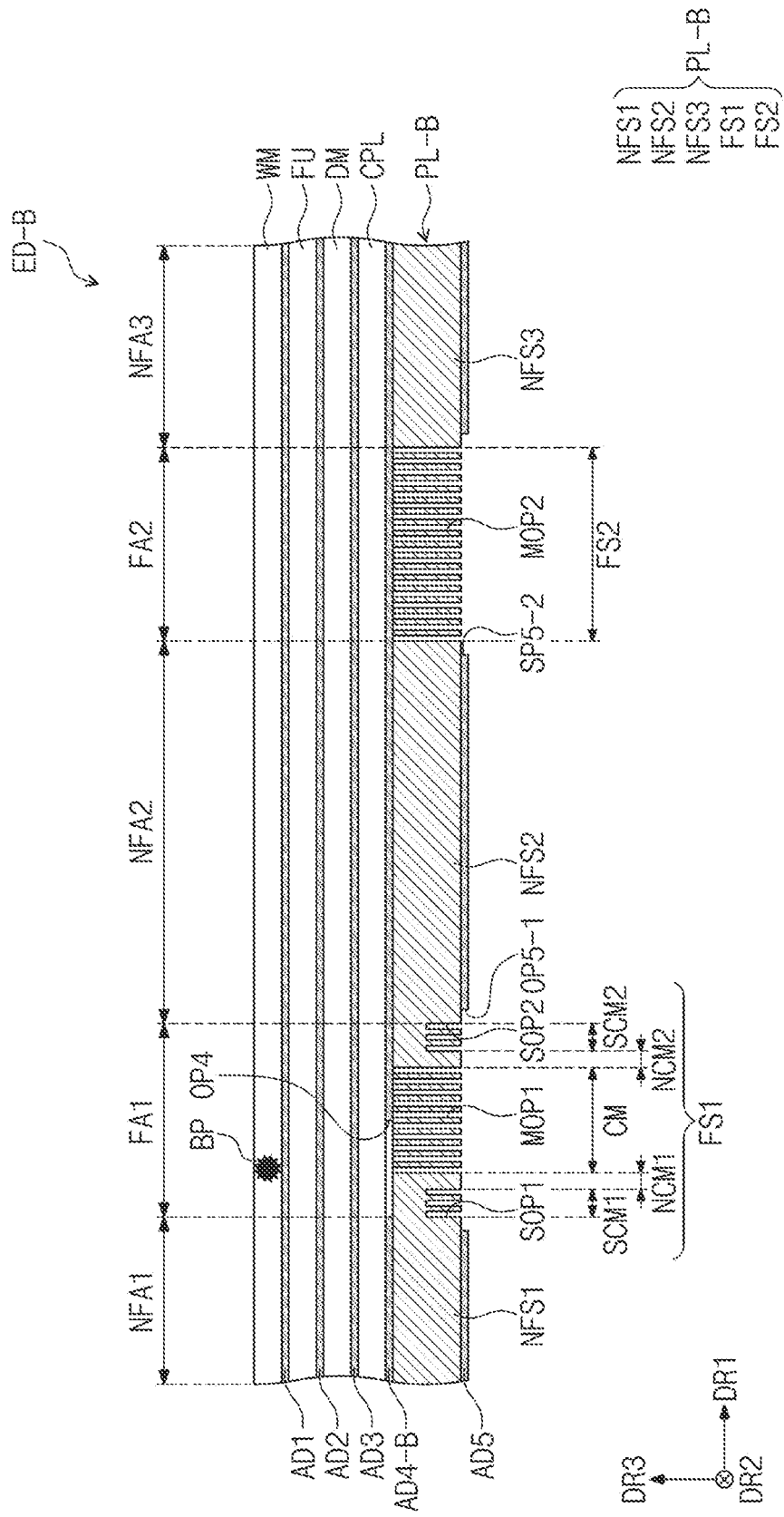
FIG. 7 illustrates a cross-sectional view showing an electronic device according to one or more embodiments.

FIG. 6 illustrates a cross-sectional view showing a folded electronic device according to one or more embodiments. FIG. 7 illustrates a cross-sectional view showing an electronic device according to one or more embodiments. The same or similar reference numerals are allocated to components that are the same as or similar to those discussed in FIGS. 1 to 6, and a repetitive description will be omitted.

FIG. 6 depicts the window WM, the display module DM, and the adhesion layer AD located between the window WM and the display module DM among the components of FIGS. 3A and 3C, and other components will be omitted for convenience of description.

An electronic device ED-S1*b* according to the presently described one or more embodiments may be folded in the same manner as that of the electronic device ED-S1 discussed in FIG. 2A.

Referring to FIG. 6, the electronic device ED-S1*b* according to one or more embodiments may be in-folded in a folding mode such that the first folding part (see FS1 of FIG. 3A) is folded in an inner-folding manner along the first folding axis FX1. Therefore, a top surface W-U of the window WM that overlaps the first non-folding region NFA1 may face a top surface W-U of the window WM that overlaps the second non-folding region NFA2.

The electronic device ED-S1*b* may be out-folded in a folding mode such that the second folding part (see FS2 of FIG. 3A) is folded in an outer-folding manner along the second folding axis FX2. Therefore, a bottom surface W-B of the window WM that overlaps the second non-folding region NFA2 may face a bottom surface W-B of the window WM that overlaps the third non-folding region NFA3. In this case, a curvature of the first folding part FS1 may be the same as, or greater than, that of the second folding part FS2.

In a folding mode of the electronic device ED-S1*b* according to the presently described one or more embodiments, the window WM on the first folding region FA1 may experience a buckling phenomenon BP at a corresponding point adjacent to the first non-folding region NFA1.

An illustration of an electronic device ED-B that will be discussed in FIG. 7 may correspond to the cross section of the electronic device ED-S1*b* discussed in FIG. 6. Therefore, the electronic device ED-B may be folded in the same operating state as that of the electronic device ED-S1 discussed in FIG. 2A.

Referring to FIG. 7, the electronic device ED-B according to one or more embodiments may include a window WM, an upper film FU, a display module DM, a lower film CPL, a plate PL-B, and a housing (see HAU of FIG. 3A). The electronic device ED-B may include adhesion layers AD1, AD2, AD3, AD4-B, and AD5 located between respective components to couple neighboring components to each other. A description of the window WM, the upper film FU, the display module DM, the lower film CPL, the adhesion layers AD1, AD2, AD3, and AD5 may correspond to that discussed in the electronic device ED-1 of FIG. 3C.

In a folding mode, the electronic device ED-B may experience a buckling phenomenon BP at a corresponding point of the window WM that overlaps the first folding region FA1. For example, the window WM on the first folding region FA1 may experience a buckling phenomenon BP at a corresponding point adjacent to the first non-folding region NFA1.

The plate PL-B may include folding parts FS1 and FS2 and non-folding parts NFS1, NFS2, and NFS3. A first folding part FS1 may overlap the first folding region FA1, and a second folding part FS2 may overlap the second folding region FA2. In one or more embodiments, a width in the first direction DR1 of the first folding part FS1 may be less than a width in the first direction DR1 of the second folding part FS2.

A first non-folding part NFS1 may overlap the first non-folding region NFA1, a second non-folding part NFS2 may overlap the second non-folding region NFA2, and a third non-folding part NFS3 may overlap the third non-folding region NFA3.

The first folding part FS1 according to one or more embodiments may include a first side curvature part SCM1, a first flat part NCM1, a main curvature part CM, a second flat part NCM2, and a second side curvature part SCM2. The first side curvature part SCM1 may extend from the first non-folding part NFS1, and the second side curvature part SCM2 may extend from the second non-folding part NFS2.

The main curvature part CM may be located between, and spaced apart from, the first side curvature part SCM1 and the second side curvature part SCM2. The first flat part NCM1 may be located between the first side curvature part SCM1 and the main curvature part CM, and the second flat part NCM2 may be located between the second side curvature part SCM2 and the main curvature part CM.

In one or more embodiments, in a folding mode, the electronic device ED-B may experience a buckling phenomenon BP at a corresponding point of the window WM that overlaps at least one selected from the first side curvature part SCM1, the first flat part NCM1, and/or the main curvature part CM.

The plate PL-B may include main holes MOP1 (which may be referred to as first holes in the claims) that overlap the main curvature part CM, and that penetrate from top to bottom surfaces of the plate PL-B.

The plate PL-B may include first side holes SOP1 that overlap the first side curvature part SCM1, and that partially penetrate in a thickness direction of the plate PL-B from the bottom surface of the plate PL-B.

In addition, the plate PL-B may include second side holes SOP2 that overlap the second side curvature part SCM2, and that partially penetrate in the thickness direction of the plate PL-B from the bottom surface of the plate PL-B.

In the presently described one or more embodiments, a folding manner of the first folding part FS1 of the electronic device ED-B may correspond to that of the first folding part FS1 of the plate PL-1 discussed in FIG. 3D.

The lower film CPL may be coupled to the plate PL-B through a fourth adhesion layer AD4-B. The fourth adhesion layer AD4-B may include/define an opening OP4 (which may be referred to as a first opening in the claims) that overlaps the first folding region FA1 and that partially exposes the plate PL-B and the lower film CPL.

According to one or more embodiments, the opening OP4 defined in the fourth adhesion layer AD4-B may extend from an area over one of the first side holes SOP1 nearest the first non-folding part NFS1 to an area over one of the main holes MOP1 that overlaps a center of, or a region near the center of, the main curvature part CM.

The present disclosure, however, is not limited thereto. The opening OP4 defined in the fourth adhesion layer AD4-B may extend from the first flat part NCM1 near the first side curvature part SCM1 to an area over one of the main holes MOP1 that overlaps a center of, or a region near the center of, the main curvature part CM, or may extend from an area over one of the main holes MOP1 nearest the first flat part NCM1 to an area over one of the main holes MOP1 that overlaps a center of, or a region near the center of, the main curvature part CM, but the present disclosure is not limited.

According to the presently described one or more embodiments, in a folding mode of the electronic device ED-B, the opening OP4 defined in the fourth adhesion layer AD4-B may overlap a location at which a buckling phenomenon BP occurs. Therefore, it may be possible to reduce or prevent the occurrence of bucking issues at a corresponding point of the window WM in a folding mode and to obtain the characteristics for reducing buckling. Accordingly, the electronic device ED-B may exhibit improved folding properties.

Figure 8:
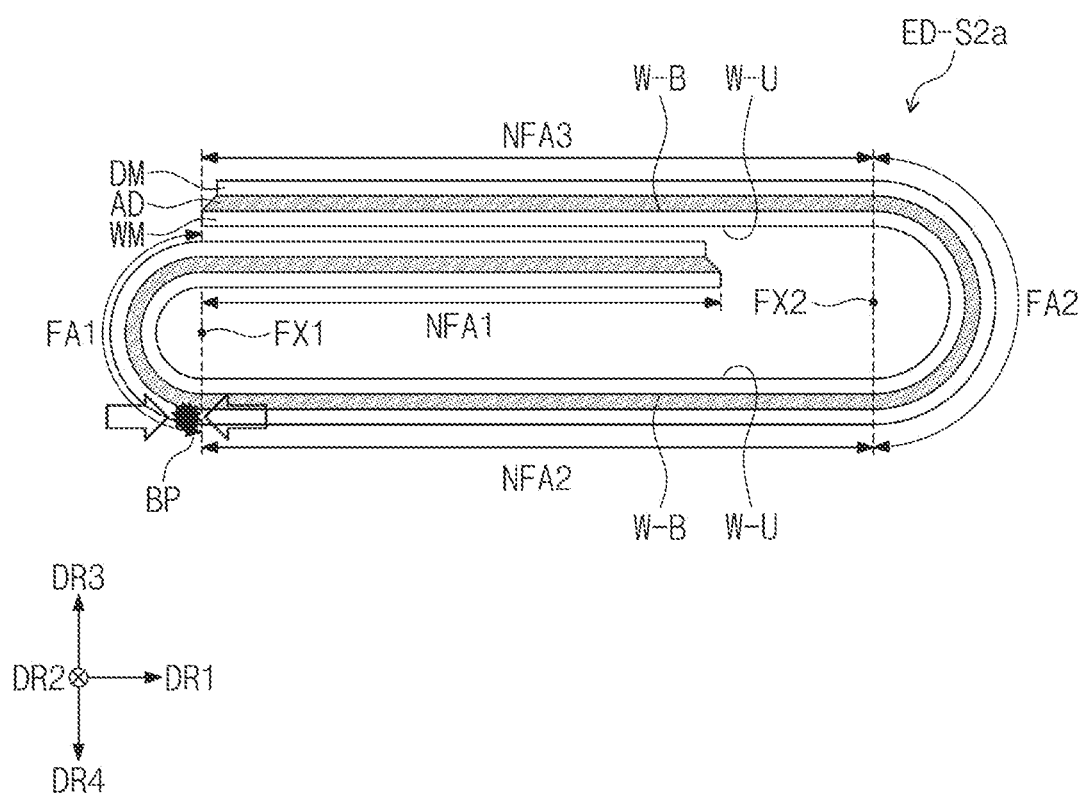
FIG. 8 illustrates a cross-sectional view showing a folded electronic device according to one or more embodiments.
Figure 9:
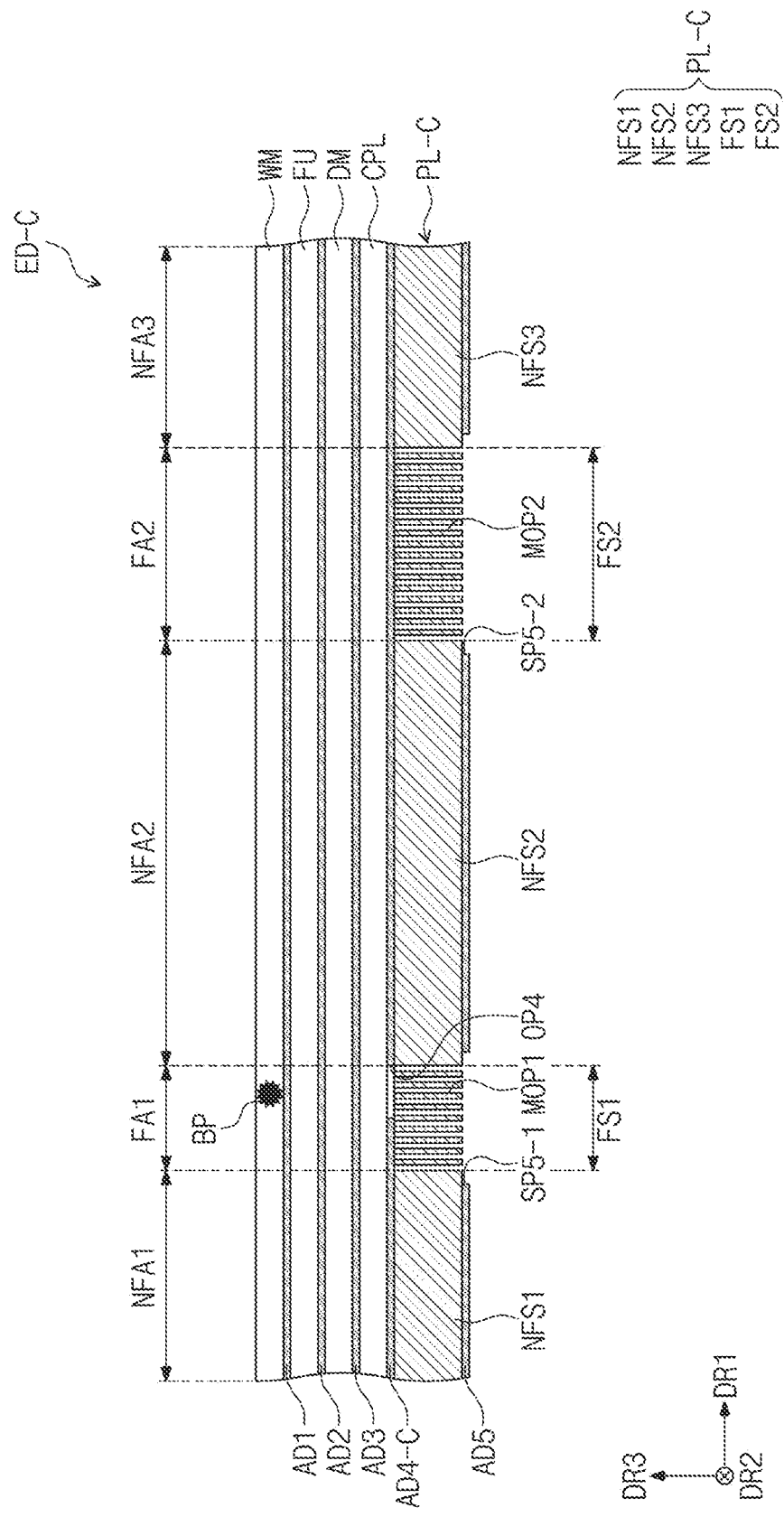
FIG. 9 illustrates a cross-sectional view showing an electronic device according to one or more embodiments.

FIG. 8 illustrates a cross-sectional view showing a folded electronic device according to one or more embodiments. FIG. 9 illustrates a cross-sectional view showing an electronic device according to one or more embodiments. The same or similar reference numerals are allocated to components that are the same as or similar to those discussed in FIGS. 1 to 3D, and a repetitive description will be omitted.

FIG. 8 depicts the window WM, the display module DM, and the adhesion layer AD located between the window WM and the display module DM among the components of FIGS. 3A and 3B, and other components will be omitted for convenience of description.

An electronic device ED-S2a according to the presently described one or more embodiments may be folded in the same manner as that of the electronic device ED-S2 discussed in FIG. 2B.

Referring to FIG. 8, the electronic device ED-S2a according to one or more embodiments may be in-folded in a folding mode such that the first folding part (see FS1 of FIG. 3A) is folded in an inner-folding manner along the first folding axis FX1. Therefore, a top surface W-U of the window WM that overlaps the first non-folding region NFA1 may face a top surface W-U of the window WM that overlaps the second non-folding region NFA2.

The electronic device ED-S2a may be in-folded in a folding mode such that the second folding part (see FS2 of FIG. 3A) is folded in an inner-folding manner along the second folding axis FX2. Therefore, a bottom surface W-B of the window WM that overlaps the first non-folding region NFA1 may face a top surface W-U of the window WM that overlaps the third non-folding region NFA3. In this case, a curvature of the first folding part FS1 may be greater than that of the second folding part FS2.

In a folding mode of the electronic device ED-S2a according to the presently described one or more embodiments, the window WM on the first folding region FA1 may experience a buckling phenomenon BP at a corresponding point adjacent to the second non-folding region NFA2.

An electronic device ED-C that will be discussed in FIG. 9 may correspond to the cross section of the electronic device ED-S2a discussed in FIG. 8. Therefore, the electronic device ED-C may be folded in the same operating state as that of the electronic device ED-S2 discussed in FIG. 2A.

Referring to FIG. 9, the electronic device ED-C according to one or more embodiments may include a window WM, an upper film FU, a display module DM, a lower film CPL, a plate PL-C, and a housing (see HAU of FIG. 3A). The electronic device ED-C may include adhesion layers AD1, AD2, AD3, AD4-C, and AD5 that are located between respective components to couple adjacent components to each other. A description of the window WM, the upper film FU, the display module DM, the lower film CPL, the adhesion layers AD1, AD2, AD3, and AD5 may correspond to that discussed in the electronic device ED-1 of FIG. 3C.

In a folding mode, the electronic device ED-C may experience a buckling phenomenon BP at a corresponding point of the window WM that overlaps the first folding region FA1. For example, the window WM on the first folding region FA1 may experience a buckling phenomenon BP at a corresponding point adjacent to the second non-folding region NFA2.

The plate PL-C may include folding parts FS1 and FS2 and non-folding parts NFS1, NFS2, and NFS3. A first folding part FS1 may overlap the first folding region FA1, and a second folding part FS2 may overlap the second folding region FA2. A width in the first direction DR1 of the first folding part FS1 may be less than a width in the first direction DR1 of the second folding part FS2.

The first folding part FS1 may include a plurality of first holes MOP1. The first holes MOP1 may be formed to penetrate in the third direction DR3 through the first folding part FS1. The first folding part FS1 except the first holes MOP1 may have a slit shape/pattern in plan view.

The second folding part FS2 may include a plurality of second holes MOP2. The second holes MOP2 may be formed to penetrate in the third direction DR3 through the second folding part FS2. The second folding part FS2 except the second holes MOP2 may have a slit shape/pattern in plan view.

A first non-folding part NFS1 may overlap the first non-folding region NFA1, a second non-folding part NFS2 may overlap the second non-folding region NFA2, and a third non-folding part NFS3 may overlap the third non-folding region NFA3.

In the electronic device ED-C of one or more embodiments, the window WM on the first folding region FA1 may experience a buckling phenomenon BP at a corresponding point adjacent to the second non-folding region NFA2.

The lower film CPL may be coupled to the plate PL-C through a fourth adhesion layer AD4-C. The fourth adhesion layer AD4-C according to the presently described one or more embodiments may include/define an opening OP4 (which may be referred to as a first opening in the claims) that overlaps the first folding region FA1 and that partially exposes the plate PL-C and the lower film CPL.

According to one or more embodiments, the opening OP4 defined in the fourth adhesion layer AD4-C may overlap the first folding part FS1 and only some of the first holes MOP1. Therefore, the first holes MOP1 that overlap the opening OP4 may be exposed from the fourth adhesion layer AD4-C through the opening OP4. For example, the opening OP4 may extend from an area over one of the first holes MOP1 nearest the second non-folding part NFS2 to an area over one of the first holes MOP1 that overlaps a center of, or a region near the center of, the first folding part FS1.

According to the presently described one or more embodiments, in a folding mode of the electronic device ED-C, the opening OP4 defined in the fourth adhesion layer AD4-C may overlap a location at which a buckling phenomenon BP occurs. Therefore, it may be possible to reduce or prevent the occurrence of bucking issues at a corresponding point of the window WM in a folding mode and to obtain the characteristics for reducing buckling. Accordingly, the electronic device ED-C may exhibit improved folding properties.

Figure 10:
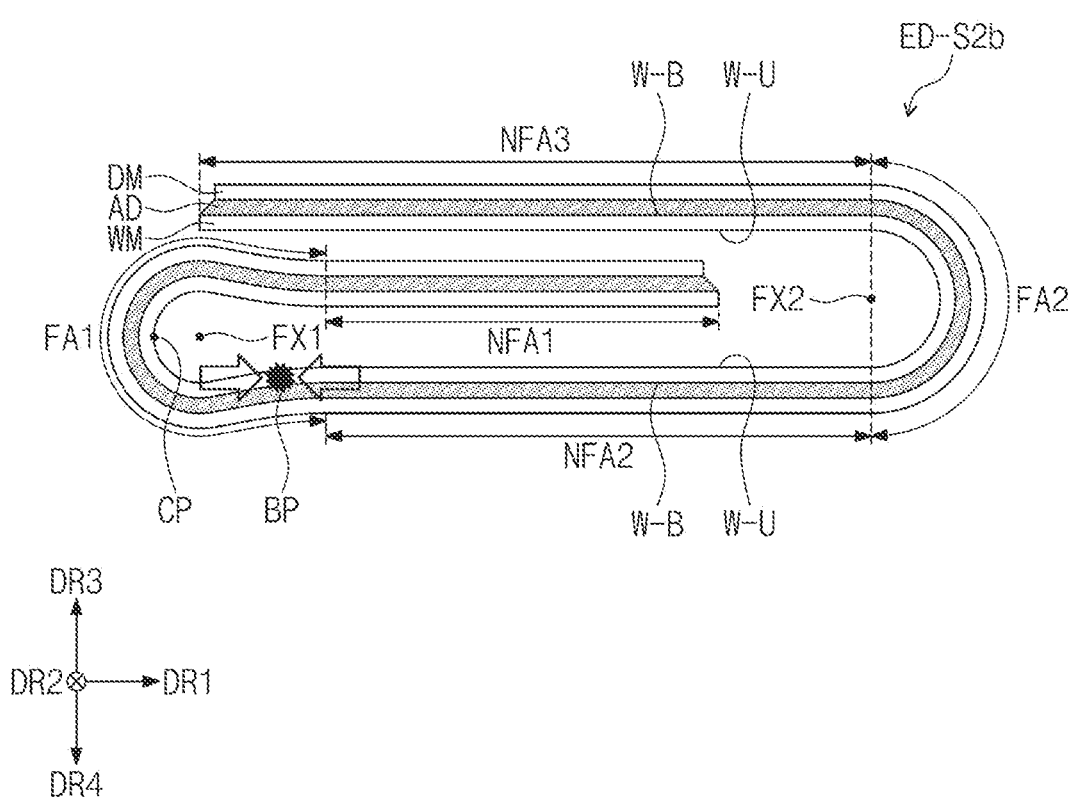
FIG. 10 illustrates a cross-sectional view showing a folded electronic device according to one or more embodiments.
Figure 11A:
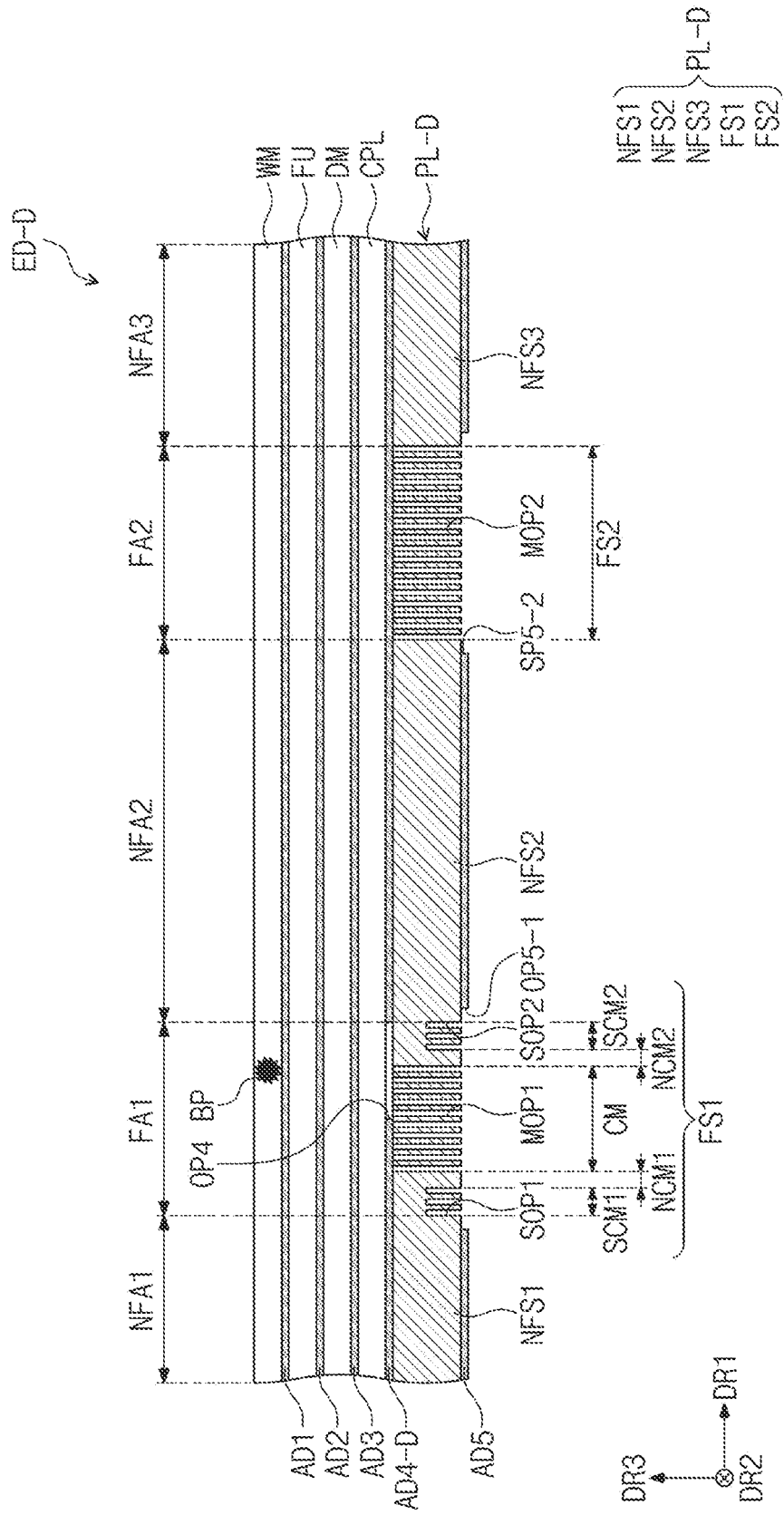
FIG. 11A illustrates a cross-sectional view showing an electronic device according to one or more embodiments.
Figure 11B:
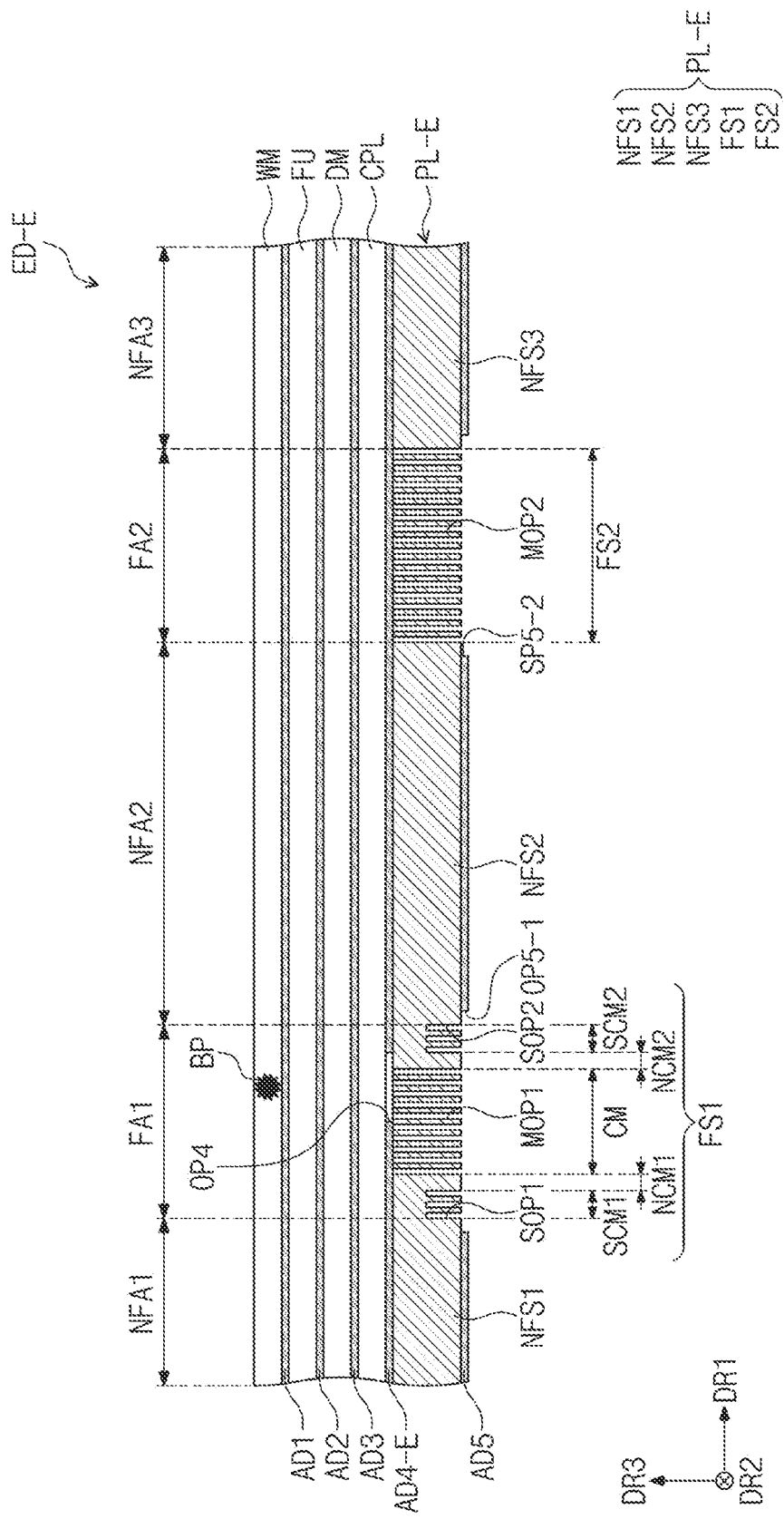
FIG. 11B illustrates a cross-sectional view showing an electronic device according to one or more embodiments.
Figure 11C:
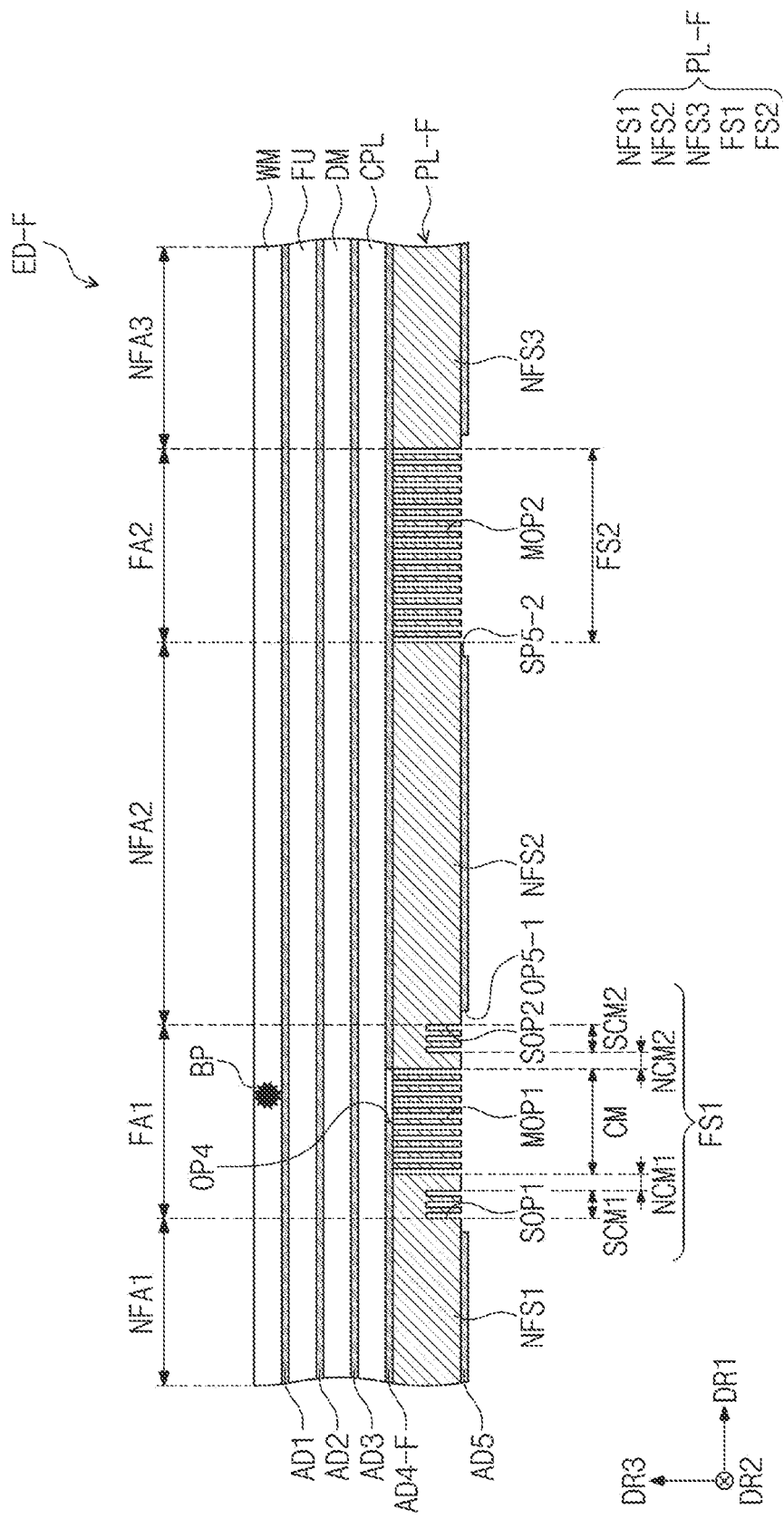
FIG. 11C illustrates a cross-sectional view showing an electronic device according to one or more embodiments.
Figure 11D:
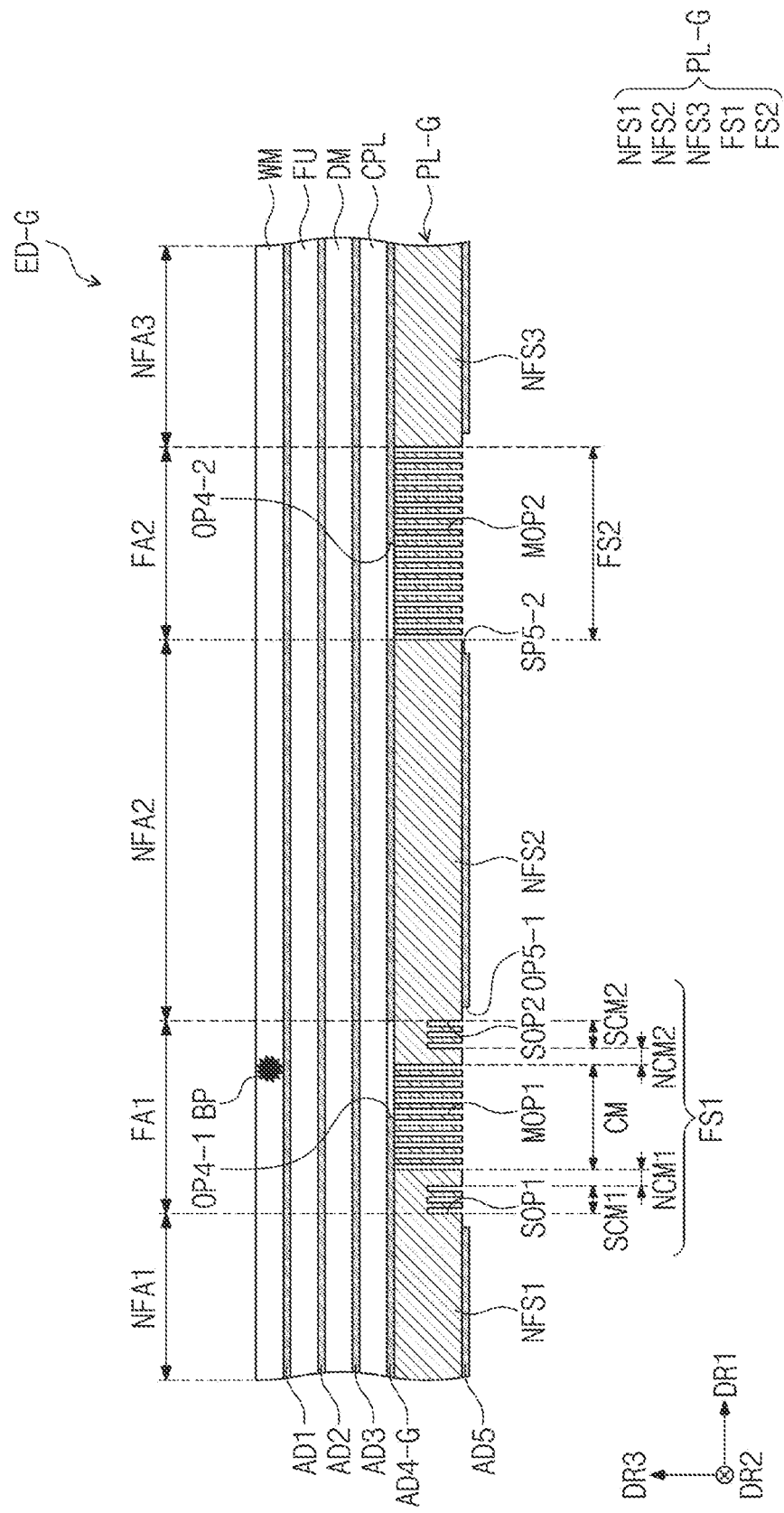
FIG. 11D illustrates a cross-sectional view showing an electronic device according to one or more embodiments.
Figure 12:
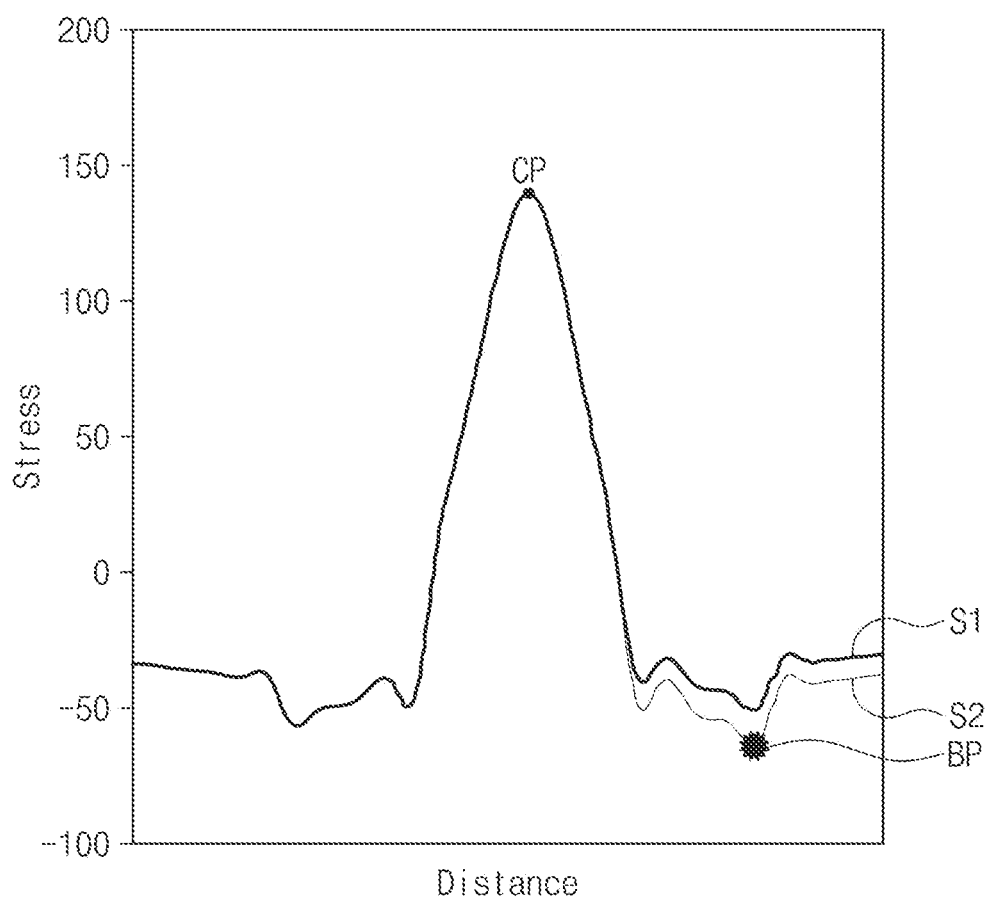
FIG. 12 illustrates a graph showing stress on a folded portion of a window according to one or more embodiments.

FIG. 10 illustrates a cross-sectional view showing a folded electronic device according to one or more embodiments. FIG. 11A illustrates a cross-sectional view showing an electronic device according to one or more embodiments. FIG. 11B illustrates a cross-sectional view showing an electronic device according to one or more embodiments. FIG. 11C illustrates a cross-sectional view showing an electronic device according to one or more embodiments. FIG. 11D illustrates a cross-sectional view showing an electronic device according to one or more embodiments. FIG. 12 illustrates a graph showing stress on a folded portion of a window according to one or more embodiments. The same or similar reference numerals are allocated to components the same as or similar to those discussed in FIGS. 1 to 9, and a repetitive description will be omitted.

FIG. 10 depicts the window WM, the display module DM, and the adhesion layer AD located between the window WM and the display module DM among the components of FIGS. 3A and 3C, and other components will be omitted for convenience of description.

An electronic device ED-S2b according to the presently described one or more embodiments may be folded in the same manner as that of the electronic device ED-S2 discussed in FIG. 2B.

Referring to FIG. 10, the electronic device ED-S2b according to one or more embodiments may be in-folded in a folding mode such that the first folding part (see FS1 of FIG. 3A) is folded in an inner-folding manner along the first folding axis FX1. Therefore, a top surface W-U of the window WM that overlaps the first non-folding region NFA1 may face a top surface W-U of the window WM that overlaps the second non-folding region NFA2.

The electronic device ED-S2b may be in-folded in a folding mode such that the second folding part (see FS2 of FIG. 3A) is folded in an inner-folding manner along the second folding axis FX2. Therefore, a bottom surface W-B of the window WM that overlaps the first non-folding region NFA1 may face a top surface W-U of the window WM that overlaps the third non-folding region NFA3. In this case, a curvature of the first folding part FS1 may be greater than that of the second folding part FS2.

In a folding mode of the electronic device ED-S2b according to the presently described one or more embodiments, the window WM on the first folding region FA1 may experience a buckling phenomenon BP at a corresponding point adjacent to the second non-folding region NFA2.

Each of electronic devices ED-D, ED-E, ED-F, and ED-G that will be discussed in FIGS. 11A, 11B, 11C, and 11C may correspond to the cross section of the electronic device ED-S2b discussed in FIG. 10. Therefore, the electronic devices ED-D, ED-E, ED-F, and ED-G may be folded in the same operating state as that of the electronic device ED-S2 discussed in FIG. 2B.

Referring to FIG. 11A, the electronic device ED-D according to one or more embodiments may include a window WM, an upper film FU, a display module DM, a lower film CPL, a plate PL-D, and a housing (see HAU of FIG. 3A). The electronic device ED-D may include adhesion layers AD1, AD2, AD3, AD4-D, and AD5 that are located between respective components to couple adjacent components to each other. A description of the window WM, the upper film FU, the display module DM, the lower film CPL, the adhesion layers AD1, AD2, AD3, and AD5 may correspond to that discussed in the electronic device ED-1 of FIG. 3C.

In a folding mode, the electronic device ED-D may experience a buckling phenomenon BP at a corresponding point of the window WM that overlaps the first folding region FA1. For example, the window WM on the first folding region FA1 may experience a buckling phenomenon BP at a corresponding point adjacent to the second non-folding region NFA2.

The plate PL-D may include folding parts FS1 and FS2 and non-folding parts NFS1, NFS2, and NFS3. A first folding part FS1 may overlap the first folding region FA1, and a second folding part FS2 may overlap the second folding region FA2. In one or more embodiments, a width in the first direction DR1 of the first folding part FS1 may be less than a width in the first direction DR1 of the second folding part FS2.

A first non-folding part NFS1 may overlap the first non-folding region NFA1, a second non-folding part NFS2 may overlap the second non-folding region NFA2, and a third non-folding part NFS3 may overlap the third non-folding region NFA3.

The first folding part FS1 according to one or more embodiments may include a first side curvature part SCM1, a first flat part NCM1, a main curvature part CM, a second flat part NCM2, and a second side curvature part SCM2. The first side curvature part SCM1 may extend from the first non-folding part NFS1, and the second side curvature part SCM2 may extend from the second non-folding part NFS2.

The main curvature part CM may be located between and spaced apart from the first side curvature part SCM1 and the second side curvature part SCM2. The first flat part NCM1 may be located between the first side curvature part SCM1 and the main curvature part CM, and the second flat part NCM2 may be located between the second side curvature part SCM2 and the main curvature part CM.

In one or more embodiments, in a folding mode, the electronic device ED-D may experience a buckling phenomenon BP at a corresponding point of the window WM that overlaps at least one selected from the second side curvature part SCM2, the second flat part NCM2, and/or the main curvature part CM.

The plate PL-D may include main holes MOP1 (which may be referred to as first holes in the claims) that overlap the main curvature part CM, and that penetrate from top to bottom surfaces of the plate PL-D.

The plate PL-D may include first side holes SOP1 that overlap the first side curvature part SCM1, and that partially penetrate in a thickness direction of the plate PL-D from the bottom surface of the plate PL-D.

In addition, the plate PL-D may include second side holes SOP2 that overlap the second side curvature part SCM2, and that partially penetrate in the thickness direction of the plate PL-D from the bottom surface of the plate PL-D.

In the presently described one or more embodiments, a folding manner of the first folding part FS1 of the electronic device ED-D may correspond to that of the first folding part FS1 of the plate PL-1 discussed in FIG. 3D.

The lower film CPL may be coupled to the plate PL-D through a fourth adhesion layer AD4-D. The fourth adhesion layer AD4-D according to the presently described one or more embodiments may include/define an opening OP4 (which may be referred to as a first opening in the claims) that overlaps the first folding region FA1 and that partially exposes the plate PL-D and the lower film CPL.

According to one or more embodiments, the opening OP4 defined in the fourth adhesion layer AD4-D may extend from an area over one of the second side holes SOP2 nearest the second non-folding part NFS2 to an area over one of the main holes MOP1 that overlaps a center of, or a region near the center of, the main curvature part CM.

According to the presently described one or more embodiments, in a folding mode of the electronic device ED-D, the opening OP4 defined in the fourth adhesion layer AD4-D may overlap a location at which a buckling phenomenon BP occurs. Therefore, it may be possible to reduce or prevent the occurrence of bucking issues at a corresponding point of the window WM in a folding mode and to obtain the characteristics for reducing buckling. Accordingly, the electronic device ED-D may exhibit improved folding properties.

Referring to FIG. 11B, the electronic device ED-E according to one or more embodiments may include a window WM, an upper film FU, a display module DM, a lower film CPL, a plate PL-E, and a housing (see HAU of FIG. 3A). The electronic device ED-E may include adhesion layers AD1, AD2, AD3, AD4-E, and AD5 that are located between respective components to couple adjacent components to each other. A description of the window WM, the upper film FU, the display module DM, the lower film CPL, the adhesion layers AD1, AD2, AD3, and AD5 may correspond to that discussed in the electronic device ED-1 of FIG. 3C. In addition, a description of the plate PL-E included in the electronic device ED-E may correspond to that of the plate PL-D discussed in FIG. 11A.

The lower film CPL may be coupled to the plate PL-E through a fourth adhesion layer AD4-E. The fourth adhesion layer AD4-E according to the presently described one or more embodiments may include/define an opening OP4 (also referred to as a first opening in the claims) that overlaps the first folding region FA1 and that partially exposes the plate PL-E and the lower film CPL.

According to one or more embodiments, the opening OP4 defined in the fourth adhesion layer AD4-E may extend from the second flat part NCM2 near the second side curvature part SCM2 to an area over one of the main holes MOP1 that overlaps a center of, or a region near the center of, the main curvature part CM.

According to the presently described one or more embodiments, in a folding mode of the electronic device ED-E, the opening OP4 defined in the fourth adhesion layer AD4-E may overlap a location at which a buckling phenomenon BP occurs. Therefore, it may be possible to reduce or prevent the occurrence of bucking issues at a corresponding point of the window WM in a folding mode and to obtain the characteristics for reducing buckling. Accordingly, the electronic device ED-E may exhibit improved folding properties.

Referring to FIG. 11C, the electronic device ED-F according to one or more embodiments may include a window WM, an upper film FU, a display module DM, a lower film CPL, a plate PL-F, and a housing (see HAU of FIG. 3A). The electronic device ED-F may include adhesion layers AD1, AD2, AD3, AD4-F, and AD5 that are located between respective components to couple adjacent components to each other. A description of the window WM, the upper film FU, the display module DM, the lower film CPL, the adhesion layers AD1, AD2, AD3, and AD5 may correspond to that discussed in the electronic device ED-1 of FIG. 3C. In addition, a description of the plate PL-F included in the electronic device ED-F may correspond to that of the plate PL-D discussed in FIG. 11A.

The lower film CPL may be coupled to the plate PL-F through a fourth adhesion layer AD4-F. The fourth adhesion layer AD4-F according to the presently described one or more embodiments may include/define an opening OP4 (also referred to as a first opening in the claims) that overlaps the first folding region FA1 and that partially exposes the plate PL-F and the lower film CPL.

According to one or more embodiments, the opening OP4 defined in the fourth adhesion layer AD4-F may extend from an area over one of the main holes MOP1 nearest the second non-folding part NFS2 to an area over one of the main holes MOP1 that overlaps a center of, or a region near the center of, the main curvature part CM.

According to the presently described one or more embodiments, in a folding mode of the electronic device ED-F, the opening OP4 defined in the fourth adhesion layer AD4-F may overlap a location at which a buckling phenomenon BP occurs. Therefore, it may be possible to reduce or prevent the occurrence of bucking issues at a corresponding point of the window WM in a folding mode and to obtain the characteristics for reducing buckling. Accordingly, the electronic device ED-F may exhibit improved folding properties.

Referring to FIG. 11D, the electronic device ED-G according to one or more embodiments may include a window WM, an upper film FU, a display module DM, a lower film CPL, a plate PL-G, and a housing (see HAU of FIG. 3A). The electronic device ED-G may include adhesion layers AD1, AD2, AD3, AD4-G, and AD5 that are located between respective components to couple adjacent components to each other. A description of the window WM, the upper film FU, the display module DM, the lower film CPL, the adhesion layers AD1, AD2, AD3, and AD5 may correspond to that discussed in the electronic device ED-1 of FIG. 3C. In addition, a description of the plate PL-G included in the electronic device ED-G may correspond to that of the plate PL-D discussed in FIG. 11A.

The lower film CPL may be coupled to the plate PL-G through a fourth adhesion layer AD4-G. The fourth adhesion layer AD4-G according to the presently described one or more embodiments may include a first opening OP4-1 that overlaps the first folding region FA1 and that partially exposes the plate PL-G and the lower film CPL.

The fourth adhesion layer AD4-G according to one or more embodiments may include a second opening OP4-2 that overlaps the second folding region FA2 and that partially exposes the plate PL-G and the lower film CPL.

According to one or more embodiments, the first opening OP4-1 defined in the fourth adhesion layer AD4-G may extend from an area over one of the second side holes SOP2 nearest the second non-folding part NFS2 to an area over one of the first holes MOP1 that overlaps a center of, or a region near the center of, the main curvature part CM. The second opening OP4-2 may extend from an area over one of the second holes MOP2 nearest the second non-folding part NFS2 to an area over one of the second holes MOP2 that overlaps a center of, or a region near the center of, the second folding part FS2.

According to the presently described one or more embodiments, in a folding mode of the electronic device ED-G, the first opening OP4-1 defined in the fourth adhesion layer AD4-G may overlap a location at which a buckling phenomenon BP occurs. In addition, as the second opening OP4-2 is additionally located on the second folding part FS2, it may be possible to reduce compressive stress applied to the window WM that overlaps the second folding part FS2. Accordingly, the electronic device ED-G may exhibit improved folding properties.

FIG. 12 illustrates a graph showing how stress changes with distance, the stress being applied to a corresponding point of the window WM that overlaps the first folding region FA1 when the first folding part FS1 is folded in an inner-folding manner along the first folding axis FX1, and when the second folding part FS2 is folded in an outer-folding manner along the second folding axis FX2, as discussed in the electronic device ED-S2b of FIG. 10.

A first graph S1 is a variation in stress applied to the window WM when the opening OP4 is included in the electronic device ED-D, ED-E, ED-F, or ED-G, and a second graph S2 is a variation in stress applied to the window WM when an opening is not included in any adhesion layer located between the window WM and the display module DM.

The symbol "CP" is shown to denote a corresponding point where maximum or relatively high tensile stress is applied to a window in a folding state. For example, as shown in FIG. 12, maximum or relatively high tensile stress (positive value) occurs at the corresponding point CP of the window WM, and maximum or relatively high compressive stress (negative value) occurs at a corresponding point of the window WM.

The second graph S2 shows that the window WM experiences a buckling phenomenon BP when there is no reduction in stress applied to at the corresponding point of the window WM to which the maximum or relatively high compressive stress is applied. Alternatively, as the electronic devices ED-D, ED-E, ED-F, and ED-G according to one or more embodiments respectively include the adhesive layers AD4-D, AD4-E, AD4-G, and AD4-G, each of which being located between the window WM and the display module DM, it may be possible to reduce stress applied to the window WM, and accordingly to reduce or prevent the likelihood of the window WM undergoing a buckling phenomenon BP.

Figure 13A:
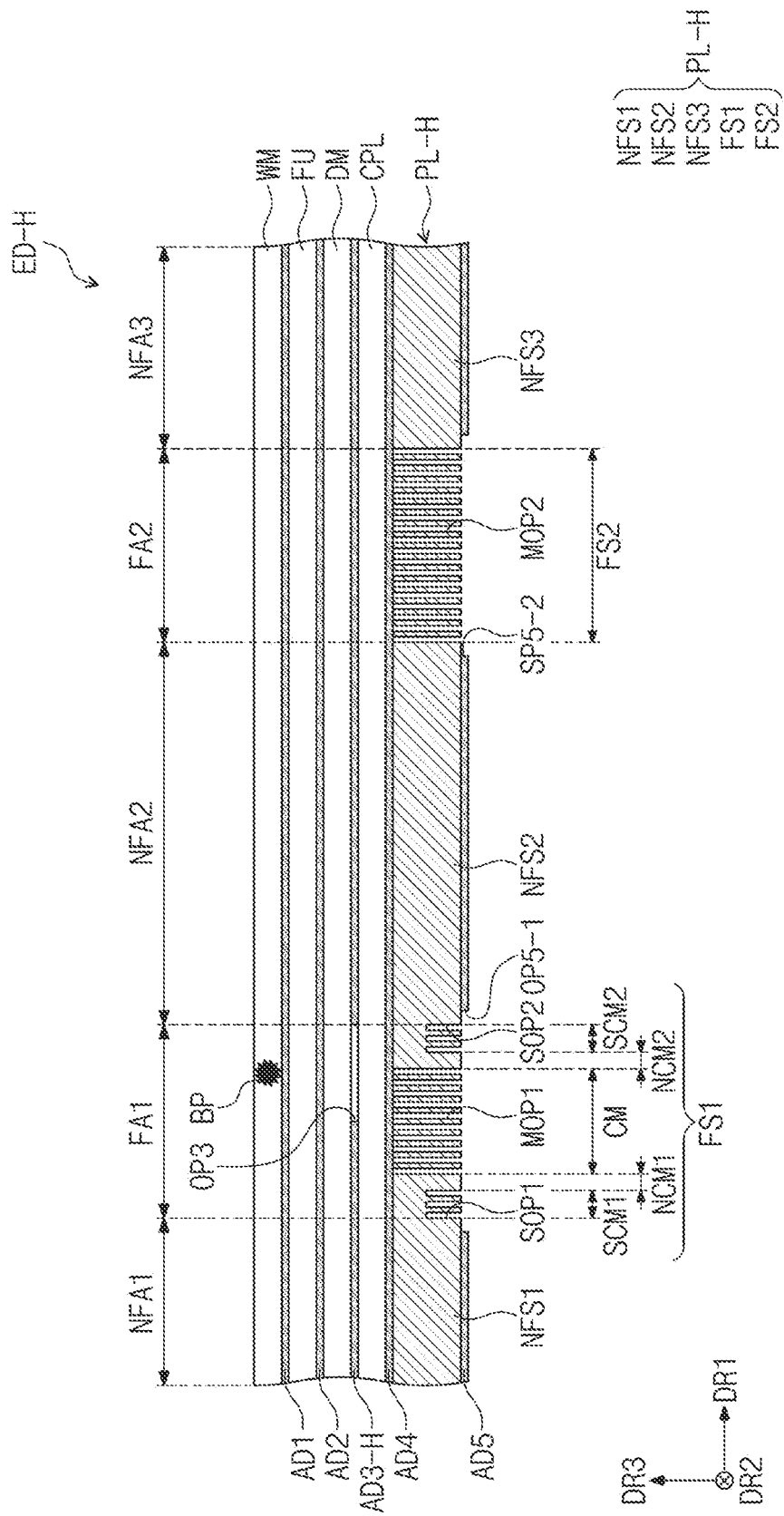
FIG. 13A illustrates a cross-sectional view showing an electronic device according to one or more embodiments.
Figure 13B:
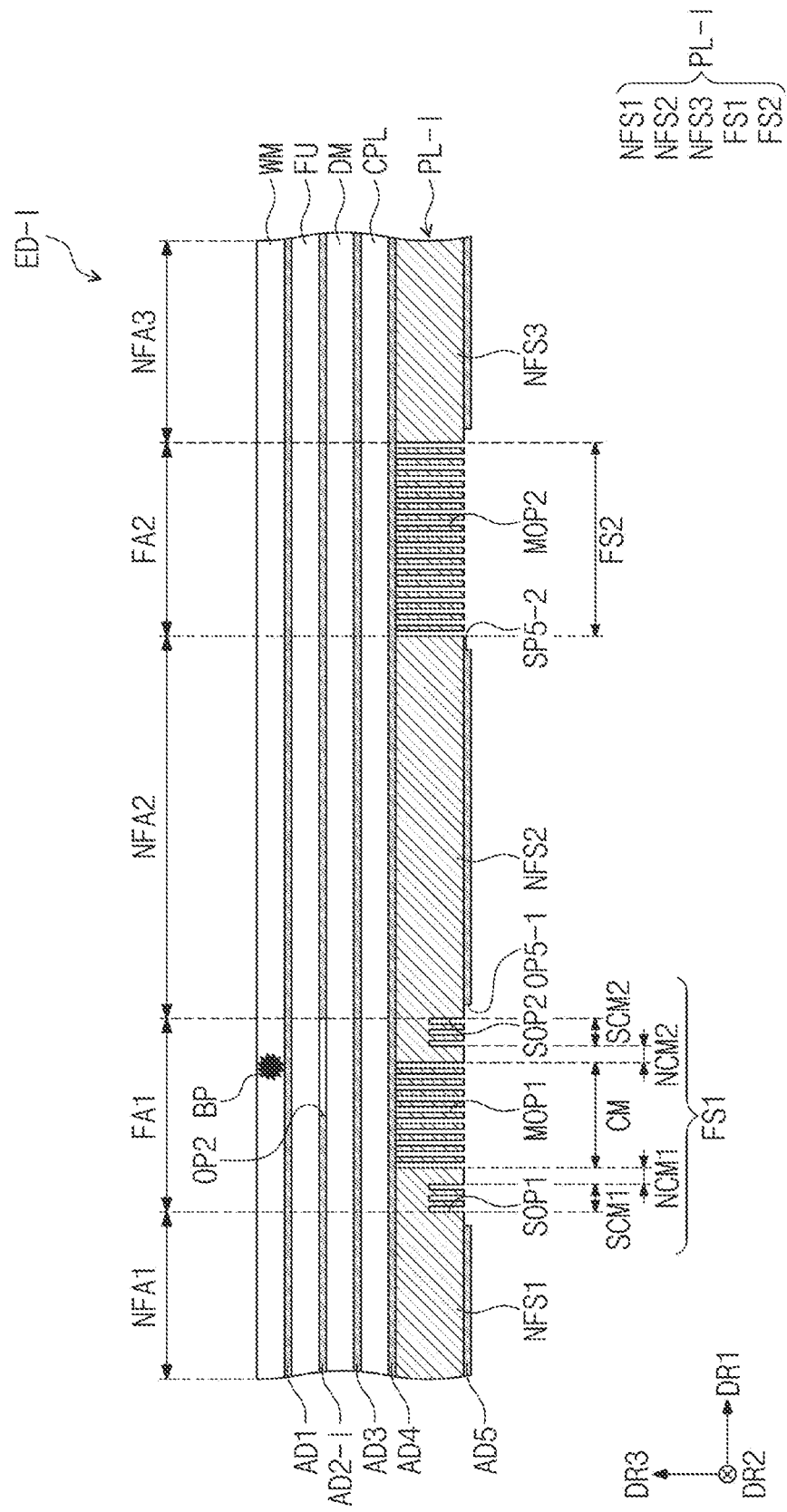
FIG. 13B illustrates a cross-sectional view showing an electronic device according to one or more embodiments.
Figure 13C:
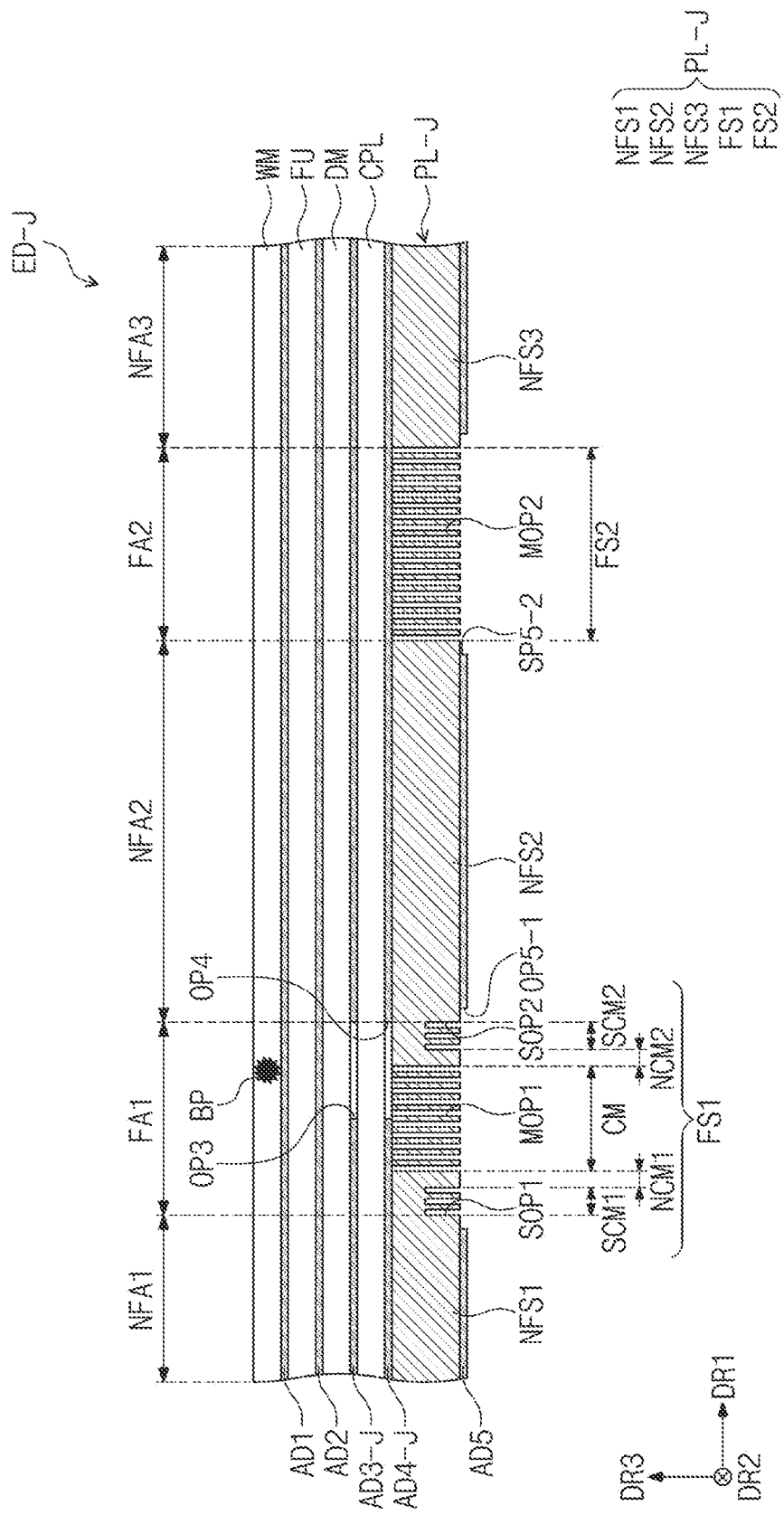
FIG. 13C illustrates a cross-sectional view showing an electronic device according to one or more embodiments.

FIG. 13A illustrates a cross-sectional view showing an electronic device according to one or more embodiments. FIG. 13B illustrates a cross-sectional view showing an electronic device according to one or more embodiments. FIG. 13C illustrates a cross-sectional view showing an electronic device according to one or more embodiments. The same or similar reference numerals are allocated to components the same as or similar to those discussed in FIGS. 1 to 12D, and a repetitive description will be omitted.

An illustration of each of electronic devices ED-H, ED-I, and ED-J which will be discussed in FIGS. 13A, 13B, and 13C may correspond to the cross section of the electronic device ED-S2b discussed in FIG. 10. Therefore, the electronic devices ED-H, ED-I, and ED-J may be folded in the same operating state as that of the electronic device ED-S2 discussed in FIG. 2B.

Referring to FIG. 13A, the electronic device ED-H according to one or more embodiments may include a window WM, an upper film FU, a display module DM, a lower film CPL, a plate PL-H, and a housing (see HAU of FIG. 3A). The electronic device ED-H may include adhesion layers AD1, AD2, AD3-H, AD4, and AD5 that are located between respective components to couple adjacent components to each other. A description of the window WM, the upper film FU, the display module DM, the lower film CPL, the adhesion layers AD1, AD2, AD4, and AD5 may correspond to that discussed in the electronic device ED-1 of FIG. 3C.

In a folding mode, the electronic device ED-H according to the present may experience a buckling phenomenon BP at a corresponding point of the window WM that overlaps the first folding region FA1. For example, the window WM on the first folding region FA1 may experience a buckling phenomenon BP at a corresponding point adjacent to the second non-folding region NFA2.

The display module DM and the lower film CPL may be coupled to each other through a third adhesion layer AD3-H. The third adhesion layer AD3-H according to the presently described one or more embodiments may include/define an opening OP3 that overlaps the first folding region FA1, and that partially exposes the display module DM and the lower film CPL.

The plate PL-H may include folding parts FS1 and FS2 and non-folding parts NFS1, NFS2, and NFS3. A first folding part FS1 may overlap the first folding region FA1, and a second folding part FS2 may overlap the second folding region FA2.

A first non-folding part NFS1 may overlap the first non-folding region NFA1, a second non-folding part NFS2 may overlap the second non-folding region NFA2, and a third non-folding part NFS3 may overlap the third non-folding region NFA3.

The first folding part FS1 according to one or more embodiments may include a first side curvature part SCM1, a first flat part NCM1, a main curvature part CM, a second flat part NCM2, and a second side curvature part SCM2. The first side curvature part SCM1 may extend from the first non-folding part NFS1, and the second side curvature part SCM2 may extend from the second non-folding part NFS2.

The plate PL-H may include main holes MOP1 (which may be referred to as first holes in the claims) that overlap the main curvature part CM, and that penetrate from top to bottom surfaces of the plate PL-H.

The plate PL-H may include first side holes SOP1 that overlap the first side curvature part SCM1, and that partially penetrate in a thickness direction of the plate PL-H from the bottom surface of the plate PL-H.

In addition, the plate PL-H may include second side holes SOP2 that overlap the second side curvature part SCM2, and that partially penetrate in the thickness direction of the plate PL-H from the bottom surface of the plate PL-H.

According to one or more embodiments, the opening OP3 defined in the third adhesion layer AD3-H may extend from an area over one of the second side holes SOP2 nearest the second non-folding part NFS2 to an area over one of the main holes MOP1 that overlaps a center of, or a region near the center of, the main curvature part CM.

Referring to FIG. 13B, the electronic device ED-I according to one or more embodiments may include a window WM, an upper film FU, a display module DM, a lower film CPL, a plate PL-I, and a housing (see HAU of FIG. 3A). The electronic device ED-I may include adhesion layers AD1, AD2-I, AD3, AD4, and AD5 that are located between respective components to couple adjacent components to each other. A description of the window WM, the upper film FU, the display module DM, the lower film CPL, the adhesion layers AD1, AD3, AD4, and AD5 may correspond to that discussed in the electronic device ED-1 of FIG. 3C.

In a folding mode, the electronic device ED-I according to the present may experience a buckling phenomenon BP at a corresponding point of the window WM that overlaps the first folding region FA1. For example, the window WM on the first folding region FA1 may experience a buckling phenomenon BP at a corresponding point adjacent to the second non-folding region NFA2.

The upper film FU and the display module DM may be coupled to each other through a second adhesion layer AD2-I. The second adhesion layer AD2-I according to the presently described one or more embodiments may include/define an opening OP2 that overlaps the first folding region FA1 and that partially exposes the upper film FU and the display module DM.

The plate PL-I may include folding parts FS1 and FS2 and non-folding parts NFS1, NFS2, and NFS3. A first folding part FS1 may overlap the first folding region FA1, and a second folding part FS2 may overlap the second folding region FA2.

A first non-folding part NFS1 may overlap the first non-folding region NFA1, a second non-folding part NFS2 may overlap the second non-folding region NFA2, and a third non-folding part NFS3 may overlap the third non-folding region NFA3.

The first folding part FS1 according to one or more embodiments may include a first side curvature part SCM1, a first flat part NCM1, a main curvature part CM, a second flat part NCM2, and a second side curvature part SCM2. The first side curvature part SCM1 may extend from the first non-folding part NFS1, and the second side curvature part SCM2 may extend from the second non-folding part NFS2.

The plate PL-I may include main holes MOP1 (which may be referred to as first holes in the claims) that overlap the main curvature part CM, and that penetrate from top to bottom surfaces of the plate PL-I.

The plate PL-I may include first side holes SOP1 that overlap the first side curvature part SCM1, and that partially penetrate in a thickness direction of the plate PL-I from the bottom surface of the plate PL-I.

In addition, the plate PL-I may include second side holes SOP2 that overlap the second side curvature part SCM2, and that partially penetrate in the thickness direction of the plate PL-I from the bottom surface of the plate PL-I.

According to one or more embodiments, the opening OP2 defined in the second adhesion layer AD2-I may extend from an area over one of the second side holes SOP2 nearest the second non-folding part NFS2 to an area over one of the main holes MOP1 that overlaps a center of, or a region near the center of, the main curvature part CM.

Referring to FIG. 13C, the electronic device ED-J according to one or more embodiments may include a window WM, an upper film FU, a display module DM, a lower film CPL, a plate PL-J, and a housing (see HAU of FIG. 3A). The electronic device ED-J may include adhesion layers AD1, AD2, AD3-J, AD4-J, and AD5 that are located between respective components to couple adjacent components to each other. A description of the window WM, the upper film FU, the display module DM, the lower film CPL, the adhesion layers AD1, AD2, and AD5 may correspond to that discussed in the electronic device ED-1 of FIG. 3C.

In a folding mode, the electronic device ED-J according to the present may experience a buckling phenomenon BP at a corresponding point of the window WM that overlaps the first folding region FA1. For example, the window WM on the first folding region FA1 may experience a buckling phenomenon BP at a corresponding point adjacent to the second non-folding region NFA2.

The display module DM and the lower film CPL may be coupled to each other through a third adhesion layer AD3-J, and the lower film CPL and the plate PL-J may be coupled to each other through a fourth adhesion layer AD4-J.

In the presently described one or more embodiments, the fourth adhesion layer AD4-J may include a first opening OP4 that overlaps the first folding region FA1 and that partially exposes the lower film CPL and the plate PL-J.

In addition, the third adhesion layer AD3-J may include a second opening OP3 that overlaps the first folding region FA1 and that partially exposes the display module DM and the lower film CPL.

The plate PL-J may include folding parts FS1 and FS2 and non-folding parts NFS1, NFS2, and NFS3. A first folding part FS1 may overlap the first folding region FA1, and a second folding part FS2 may overlap the second folding region FA2.

A first non-folding part NFS1 may overlap the first non-folding region NFA1, a second non-folding part NFS2 may overlap the second non-folding region NFA2, and a third non-folding part NFS3 may overlap the third non-folding region NFA3.

The first folding part FS1 according to one or more embodiments may include a first side curvature part SCM1, a first flat part NCM1, a main curvature part CM, a second flat part NCM2, and a second side curvature part SCM2. The first side curvature part SCM1 may extend from the first non-folding part NFS1, and the second side curvature part SCM2 may extend from the second non-folding part NFS2.

The plate PL-J may include main holes MOP1 (which may be referred to as first holes in the claims) that overlap the main curvature part CM, and that penetrate from top to bottom surfaces of the plate PL-J.

The plate PL-J may include first side holes SOP1 that overlap the first side curvature part SCM1, and that partially penetrate in a thickness direction of the plate PL-J from the bottom surface of the plate PL-J.

In addition, the plate PL-J may include second side holes SOP2 that overlap the second side curvature part SCM2, and that partially penetrate in the thickness direction of the plate PL-J from the bottom surface of the plate PL-J.

According to one or more embodiments, the first opening OP4 defined in the fourth adhesion layer AD4-J and the second opening OP3 defined in the third adhesion layer AD3-J may extend from an area over one of the second side holes SOP2 nearest the second non-folding part NFS2 to an area over one of the main holes MOP1 that overlaps a center of, or a region near the center of, the main curvature part CM.

According to the presently described one or more embodiments, as an opening of an adhesion layer is formed at a point of a window to which maximum or relatively high compressive stress is applied in a folding mode of an electronic device, it may be possible to reduce compressive stress applied to the window that overlaps the opening. Therefore, the occurrence of bucking issue may be reduced or prevented, while decoupling characteristics may be achieved, and as a result, it may be possible to provide an electronic device with improved folding properties.

Although the embodiments have been described with reference to a number of illustrative examples thereof, it will be understood by those of ordinary skill in the art that various changes in form and details may be made without departing from the spirit and scope of the present disclosure as set forth in the following claims. Thus, the technical scope of the present disclosure is not limited by the embodiments and examples described above, but by the following claims, with functional equivalents thereof to be included therein.

What is claimed is:

1. An electronic device, comprising:
    a display module;
    a window above the display module and comprising a bottom surface facing the display module, and a top surface opposite to the bottom surface;
    a lower film below the display module;
    a plate below the lower film and comprising a first non-folding part, a first folding part, a second non-folding part, a second folding part, and a third non-folding part that are sequentially arranged, the first folding part being configured to be folded with a first curvature and defining first holes, and the second folding part being configured to be folded with a second curvature that is different from the first curvature and defining second holes; and
    a first adhesion layer between the window and the plate, and defining a first opening that overlaps the first folding part and some of the first holes, the first opening being spaced apart from the remaining first holes in a plan view.

2. The electronic device of claim 1, wherein, in a folding mode:
    the first folding part is configured to be folded such that the top surface of the window that overlaps the first non-folding part faces the top surface of the window that overlaps the second non-folding part;
    the second folding part is configured to be folded such that the bottom surface of the window that overlaps the second non-folding part faces the bottom surface of the window that overlaps the third non-folding part; and
    the first curvature is greater than the second curvature.

3. The electronic device of claim 2, wherein the first opening extends from an area over one of the first holes nearest the first non-folding part to an area over one of the first holes that overlaps a region at or near a center of the first folding part.

4. The electronic device of claim 2, wherein the first folding part comprises:
    a first side curvature part that extends from the first non-folding part;
    a second side curvature part that extends from the second non-folding part;
    a main curvature part between the first side curvature part and the second side curvature part, and defining the first holes;
    a first flat part between the first side curvature part and the main curvature part; and
    a second flat part between the second side curvature part and the main curvature part,
    wherein a center of curvature of the main curvature part is above the top surface of the window, and
    wherein a center of curvature of each of the first and second side curvature parts is below the bottom surface of the window.

5. The electronic device of claim 4, wherein the plate defines:
    first side holes that overlap the first side curvature part, and that partially penetrate from a bottom surface of the plate; and
    second side holes that overlap the second side curvature part, and that partially penetrate from the bottom surface of the plate.

6. The electronic device of claim 5, wherein the first opening extends from an area over one of the first side holes nearest the first non-folding part to an area over one of the first holes that overlaps a region at or near a center of the main curvature part.

7. The electronic device of claim 5, wherein the first opening extends from an area over the first flat part near the first side curvature part to an area over one of the first holes that overlaps a region at or near a center of the main curvature part.

8. The electronic device of claim 5, wherein the first opening extends from an area over one of the first holes nearest the first flat part to an area over one of the first holes that overlaps a region at or near a center of the main curvature part.

9. The electronic device of claim 1, wherein, in a folding mode:
    the first folding part is configured to be folded such that the top surface of the window that overlaps the first non-folding part faces the top surface of the window that overlaps the second non-folding part;
    the second folding part is configured to be folded such that the bottom surface of the window that overlaps the first non-folding part faces the top surface of the window that overlaps the third non-folding part; and
    the first curvature is greater than the second curvature.

10. The electronic device of claim 9, wherein the first opening extends from an area over one of the first holes nearest the first non-folding part to an area over one of the first holes that overlaps a region at or near a center of the first folding part.

11. The electronic device of claim 9, wherein the first folding part comprises:
   a first side curvature part that extends from the first non-folding part;
   a second side curvature part that extends from the second non-folding part;
   a main curvature part between the first side curvature part and the second side curvature part;
   a first flat part between the first side curvature part and the main curvature part; and
   a second flat part between the second side curvature part and the main curvature part,
   wherein a center of curvature of the main curvature part is above the top surface of the window, and
   wherein a center of curvature of each of the first and second side curvature parts is below the bottom surface of the window.

12. The electronic device of claim 11, wherein the plate defines:
   first side holes that overlap the first side curvature part, and that penetrate a portion of the plate; and
   second side holes that overlap the second side curvature part, and that penetrate a portion of the plate.

13. The electronic device of claim 12, wherein the first opening extends from an area over one of the second side holes nearest the second non-folding part to an area over one of the first holes that overlaps a region at or near a center of the main curvature part.

14. The electronic device of claim 12, wherein the first opening extends from an area over the second flat part near the second side curvature part to an area over one of the first holes that overlaps a region at or near a center of the main curvature part.

15. The electronic device of claim 12, wherein the first opening extends from an area over one of the first holes nearest the second flat part to an area over one of the first holes that overlaps a region at or near a center of the main curvature part.

16. The electronic device of claim 9, wherein the first adhesion layer defines a second opening that overlaps the second folding part and some of the second holes, and that extends from an area over one of the second holes nearest the second non-folding part to an area over one of the second holes that overlaps a region at or near a center of the second folding part.

17. The electronic device of claim 1, further comprising a second adhesion layer between the display module and the lower film,
   wherein the second adhesion layer defines an additional opening that overlaps the first opening, and
   wherein the first adhesion layer is between the lower film and the plate.

18. The electronic device of claim 1, further comprising a third adhesion layer below the plate, and defining a third opening that overlaps the first holes, and a fourth opening that overlaps the second holes.

19. The electronic device of claim 1, wherein the plate comprises a stainless steel or a fiber-reinforced composite material.

20. The electronic device of claim 1, further comprising an upper film between the window and the display module, and comprising a synthetic resin.

* * * * *